US007849093B2

(12) United States Patent
Farago et al.

(10) Patent No.: US 7,849,093 B2
(45) Date of Patent: Dec. 7, 2010

(54) SEARCHES OVER A COLLECTION OF ITEMS THROUGH CLASSIFICATION AND DISPLAY OF MEDIA GALLERIES

(75) Inventors: Julia H. Farago, Seattle, WA (US); Nicholas A. Whyte, Mercer Island, WA (US); Ramez Naam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 11/250,864

(22) Filed: Oct. 14, 2005

(65) Prior Publication Data

US 2007/0088678 A1 Apr. 19, 2007

(51) Int. Cl.
G06F 7/00 (2006.01)
G06F 17/30 (2006.01)
(52) U.S. Cl. ................................... 707/755
(58) Field of Classification Search ........... 707/2, 707/3, 4, 5, 6, 102, 104, 104.1, 999.004, 707/755, 999.102; 705/27; 709/225; 715/532
See application file for complete search history.

(56) References Cited

U.S. PATENT DOCUMENTS

| | | | |
|---|---|---|---|
| 5,864,863 A * | 1/1999 | Burrows | 707/103 R |
| 6,271,840 B1 | 8/2001 | Finseth | |
| 6,295,559 B1 | 9/2001 | Emens | |
| 6,397,181 B1 | 5/2002 | Li | |
| 6,418,430 B1 | 7/2002 | DeFazio | |
| 6,643,641 B1 | 11/2003 | Snyder | |
| 6,901,207 B1 | 5/2005 | Watkins | |
| 7,296,009 B1 * | 11/2007 | Jiang et al. | 707/3 |
| 2002/0004793 A1 | 1/2002 | Keith | |
| 2002/0070982 A1 * | 6/2002 | Hill et al. | 345/835 |
| 2002/0091688 A1 | 7/2002 | Decary | |
| 2002/0099694 A1 * | 7/2002 | Diamond et al. | 707/3 |

(Continued)

FOREIGN PATENT DOCUMENTS

GB 2380575 4/2003

(Continued)

OTHER PUBLICATIONS

Coppermine Photo Gallery v1.3.3: Documentation and Manual; About Coppermine. Gregory Demar and the Coppermine Dev Team, 2002-2004. http://coppermine.sourceforge.net/manual.php. Last accessed Oct. 14, 2005. 48 pages.

(Continued)

Primary Examiner—Mohammad Ali
Assistant Examiner—Alexey Shmatov
(74) Attorney, Agent, or Firm—Shook, Hardy & Bacon LLP

(57) ABSTRACT

Architecture is provided for performing multimedia searches and returning media galleries, and then prominently displaying the galleries to a user. The disclosed innovation generates a gallery classifier and then displays found galleries to the user in a new and informative user interface. In one aspect, a system is provided that facilitates searching data for gallery pages. The system includes a gallery classifier that receives web data associated with web pages, and identifies a web page as a gallery page during a search operation. The system also includes a gallery user interface that presents a gallery page and associated content as part of the search process.

16 Claims, 20 Drawing Sheets

U.S. PATENT DOCUMENTS

| | | | |
|---|---|---|---|
| 2002/0138487 A1* | 9/2002 | Weiss et al. .................... | 707/10 |
| 2003/0018622 A1* | 1/2003 | Chau ............................. | 707/3 |
| 2003/0110163 A1 | 6/2003 | Chen | |
| 2003/0135430 A1 | 7/2003 | Ibbotson | |
| 2003/0179213 A1 | 9/2003 | Liu | |
| 2003/0216930 A1* | 11/2003 | Dunham et al. ................ | 705/1 |
| 2004/0059720 A1* | 3/2004 | Rodriguez .................... | 707/3 |
| 2004/0064443 A1* | 4/2004 | Taniguchi et al. .............. | 707/3 |
| 2005/0108189 A1 | 5/2005 | Samsonov | |
| 2005/0114306 A1* | 5/2005 | Shu et al. ...................... | 707/3 |
| 2006/0085391 A1* | 4/2006 | Turski et al. ................... | 707/3 |
| 2006/0242553 A1* | 10/2006 | Kulas ..................... | 715/501.1 |
| 2007/0130112 A1* | 6/2007 | Lin ............................... | 707/2 |

FOREIGN PATENT DOCUMENTS

WO      WO0135714      5/2001

OTHER PUBLICATIONS

Xhara; Xahara search technology. Xahara, 2003-2005. http://www.xahara.com/index.php?page=technology. Last accessed Oct. 14, 2005. 2 pages.

csGallery—Only $99 (Free Installation ); Description of csGallery. http://www.scriptsearch.com/cgi-bin/jump.cgi?ID=6853. Last accessed Oct. 14, 2005. 3 pages.

Web Imaqe Collector 2005; http://www.safesite.com/product.php%5Bid%5D88436%5Bcid%5D165%5BSiteID%5Ddigibuy. Last accessed Oct. 14, 2005. 2 pages.

Cerious Software; ThumbsPlus WebClient Server Features. Cerious Software Inc., 1997-2005. http://www.cerious.com/tpwcs.shtml. Last accessed Oct. 14, 2005. 4 pages.

* cited by examiner

SEARCHES OVER A COLLECTION OF ITEMS THROUGH CLASSIFICATION AND DISPLAY OF MEDIA GALLERIES

BACKGROUND

With the advent of the Internet, enormous amounts of information have been made accessible via the network to users of all skill levels and backgrounds. This also applies to technological advances in hardware storage systems that facilitate storing large amounts of data (e.g., gigabytes and terabytes) on a user's home computer. Users, both home and professional, are now prone to store anything and everything since the cost to do so is becoming cheaper. Advances in network bandwidth as well as computing bandwidth have facilitates the generation and transmission of all kinds and types of content. In the not too recent past, the content that dominated the Internet was primarily text-based content. However, multimedia content (e.g., audio, video and image content) provides a more rich experience can now be considered dominate all web site content and will be communicated easily to millions of users, thereby making data organization and searching even more difficult. Multimedia content is being provided for access via most any device and system, including fixed and portable computers, cellular telephones, and IP-connected televisions, for example.

Today, multimedia search engines, and image search engines in particular, provide poor user experiences. When a user searches for an image, they are oftentimes trying to find multiple good images and then trying to browse those images. This implies that image search providers should aim to provide a faster route to pages that offer a gallery-like user experience. Moreover, users expect similar browse-oriented behaviors in audio and video searches.

Currently, no search engine properly addresses this problem because none of them place value in the concept of an image or a media gallery (a page dedicated to browsing media).

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed herein is an improved architecture for performing multimedia searches. The invention identifies image or media galleries and then prominently displays the galleries to a user. By returning the more useful, browse-friendly results to the user, the overall user experience is improved.

The disclosed innovation generates a gallery classifier and then displays found galleries to the user in a new and informative user interface. A specific example is the following. If a user is interested in space travel and searches for photos of a NASA space launch, the user wants to see what it looks like when a shuttle takes off and various other related images to learn more. The user can navigate to an image search and type in a query such as "NASA space launch". In conventional systems, the user would receive a screen of thumbnail images most of which point to a web page of mostly text and 1-2 images, some of which include hyperlinks that point to web pages with many images of the NASA space launch. In accordance with this innovation, the web pages with many useful pictures will be bubbled up to the top of the results so that the user is directed towards the more useful browser-oriented pages.

The invention disclosed and claimed herein, in one aspect thereof, comprises a system that facilitates searching web pages for gallery pages or media galleries. The system can include a classification component that receives web data associated with web pages, and generates a likelihood values that a web page is a gallery page during a search operation. The system can also include a presentation component that facilitates presentation of a gallery page as part of the search operation.

In another aspect of the subject invention, a gallery page user interface is provided for presenting audio, video, and/or image content.

In yet another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
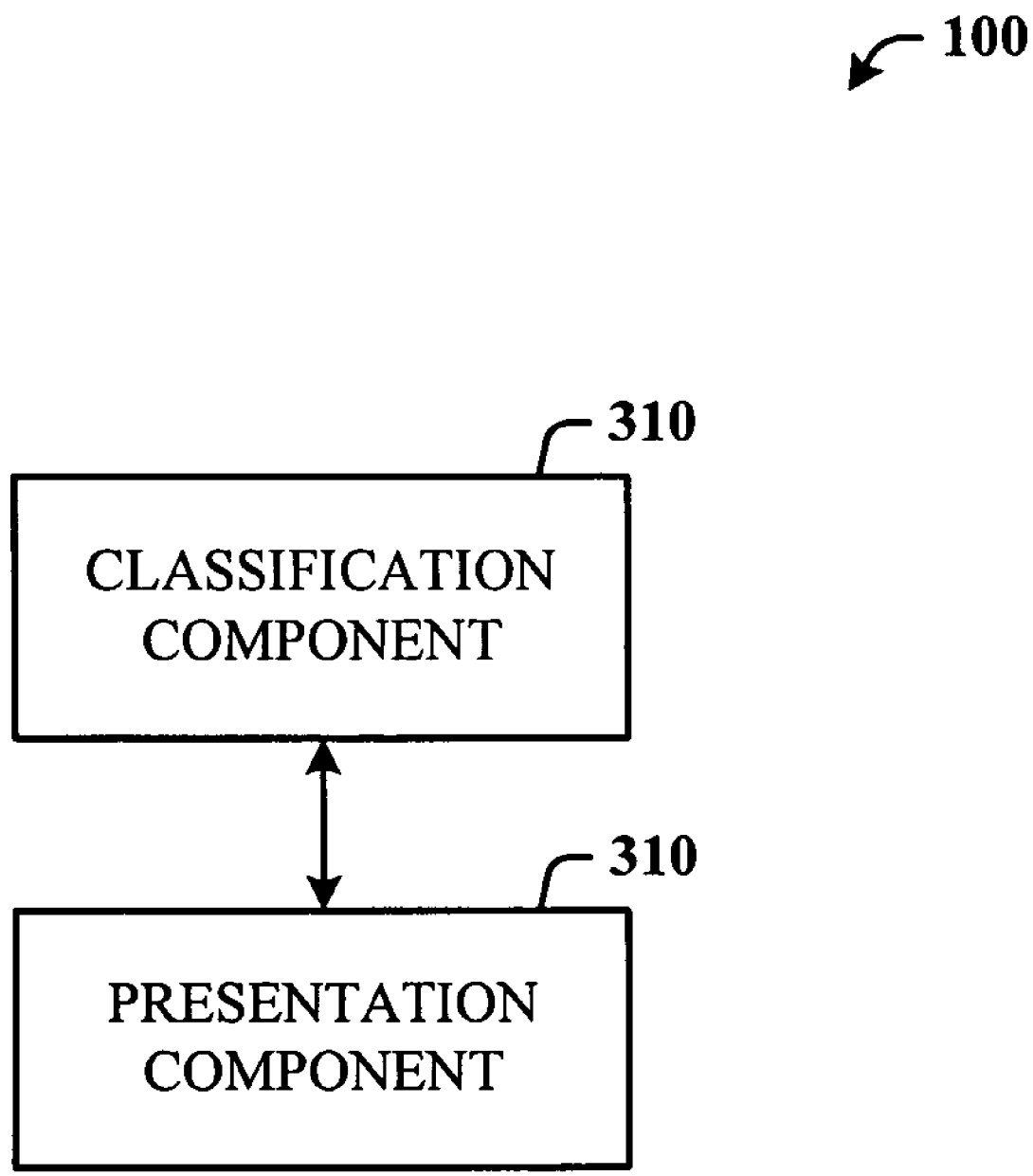
FIG. 1 illustrates a system that facilitates searching data gallery page processing in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Described herein is an improved system for performing multimedia content searches. This invention improves upon the prior art by providing architecture for identifying media galleries and then prominently displaying them to a user. By returning these more useful, browse-friendly results to the user, the overall user experience is improved. One benefit allows the end user to get to the final desired experience of browsing relevant multimedia content faster.

Referring initially to the drawings, FIG. 1 illustrates a system 100 that facilitates searching data gallery page processing in accordance with an innovative aspect. The system 100 can include a classification component 102 that receives web data associated with web pages, and can identify a web page as a gallery page during a search operation based on the web page data. The system 100 can also include a presentation component 104 that presents a gallery page via a user interface as part of the search results.

Figure 2:
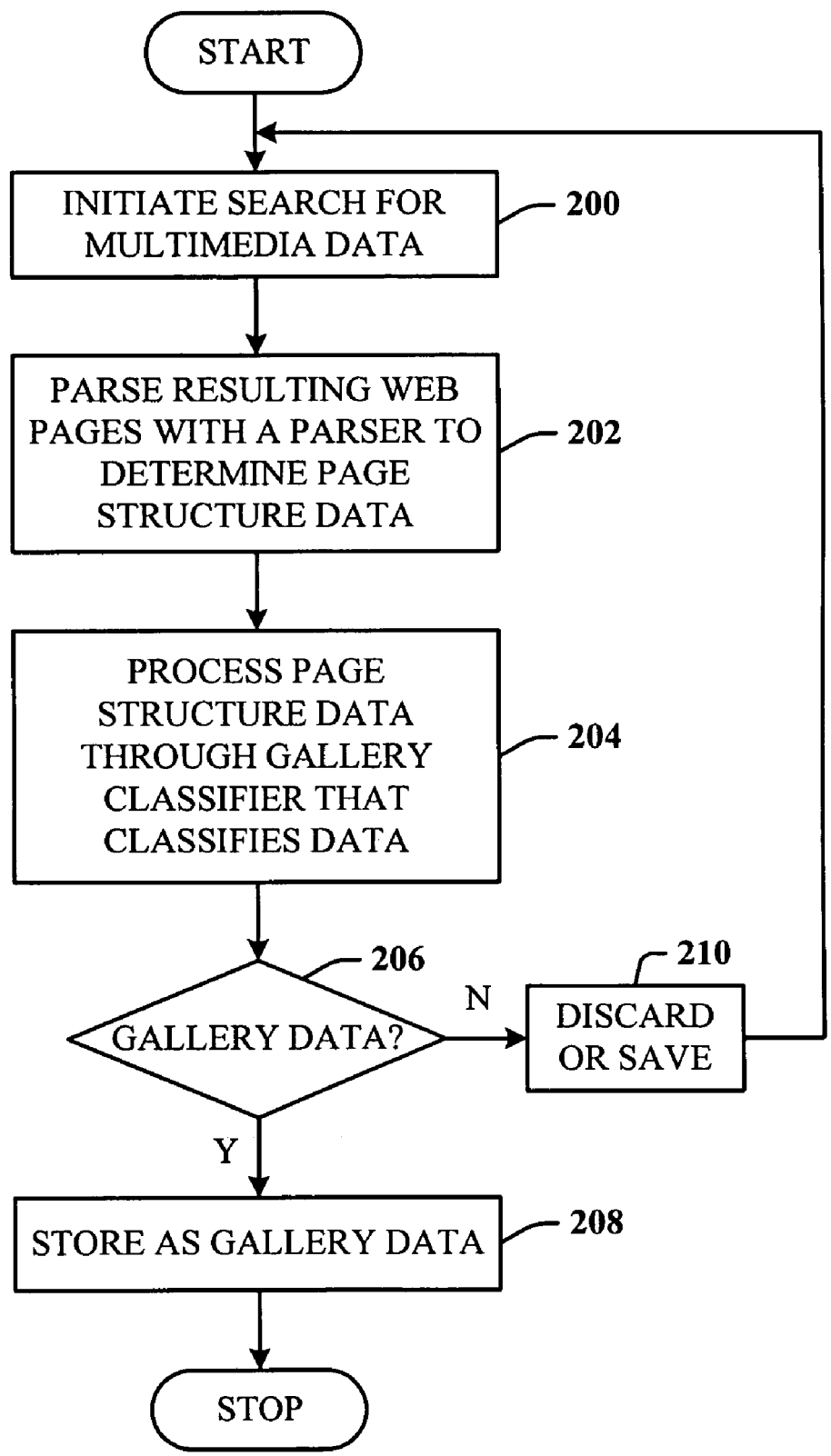
FIG. 2 illustrates a methodology of processing search results to output gallery pages in accordance with an aspect.

FIG. 2 illustrates a methodology of processing search results to output gallery pages in accordance with an aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a search for multimedia content is initiated. This can be a search conducted over the Internet, a LAN, WAN, or any network that provides access to gallery data. At 202, web pages are returned as search results. The web pages are passed into parser to parse the web page data and content into a web page structure which can be further processed. At 204, the page structure data is passed to a gallery classifier that analyzes the structure data against predetermined criteria. At 206, the system checks if the web page is a gallery page. If so, at 208, the web page is stored and/or presented in the search results as a gallery page. If the web page is determined not to include gallery data, flow is from 206 to 210 to either discard the web page or save and present as a non-gallery web page. Flow then proceeds back to 200 to process the next search and associated web pages.

Figure 3:
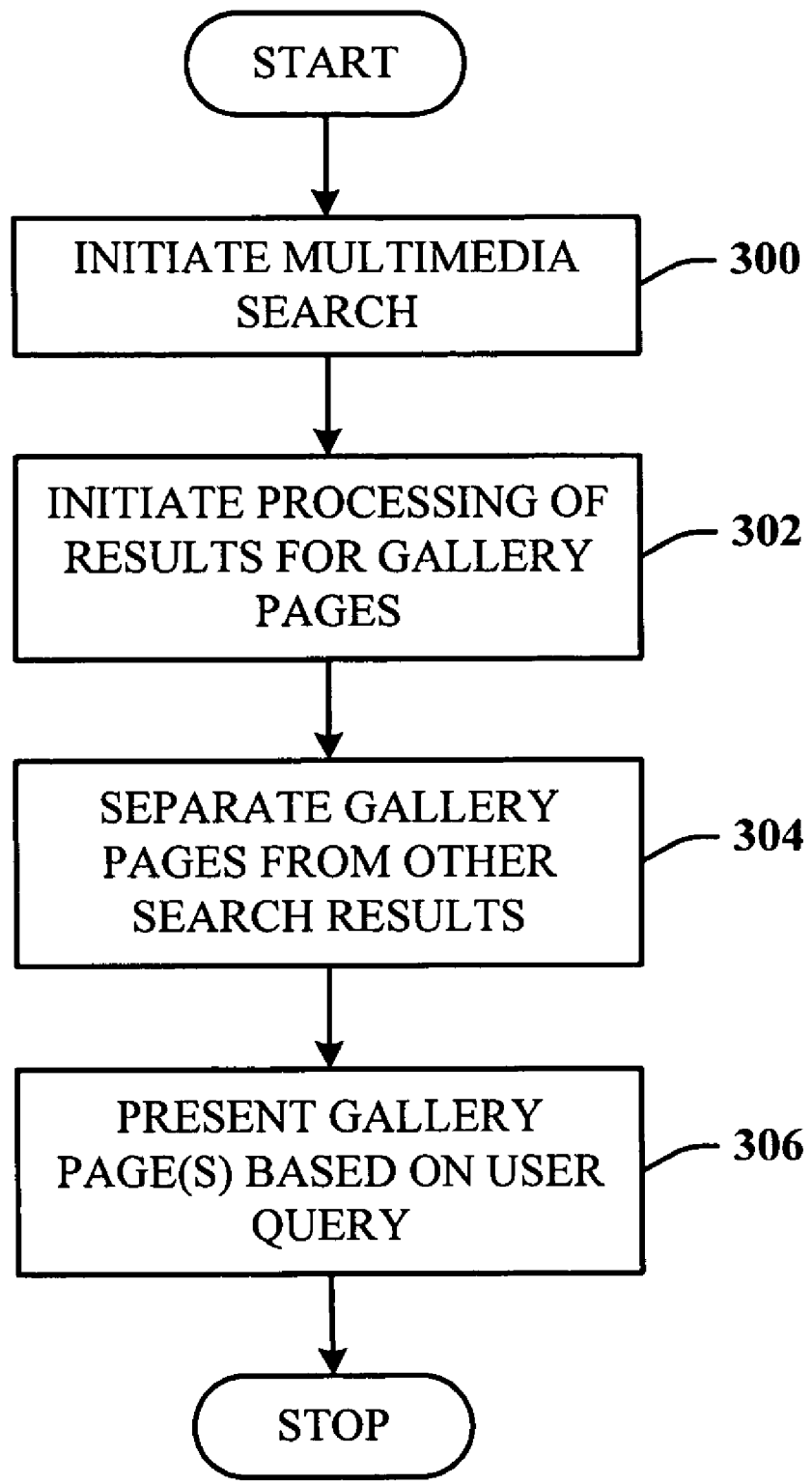
FIG. 3 illustrates a methodology of presenting a gallery page in accordance with another aspect.

Referring now to FIG. 3, there is illustrated a methodology of presenting a gallery page in accordance with another aspect. At 300, a query is submitted for a multimedia search. At 302, multimedia results are returned and processed. At 304, gallery pages are separated from other search results. At 306, the gallery pages are presented based on the query.

Figure 4:
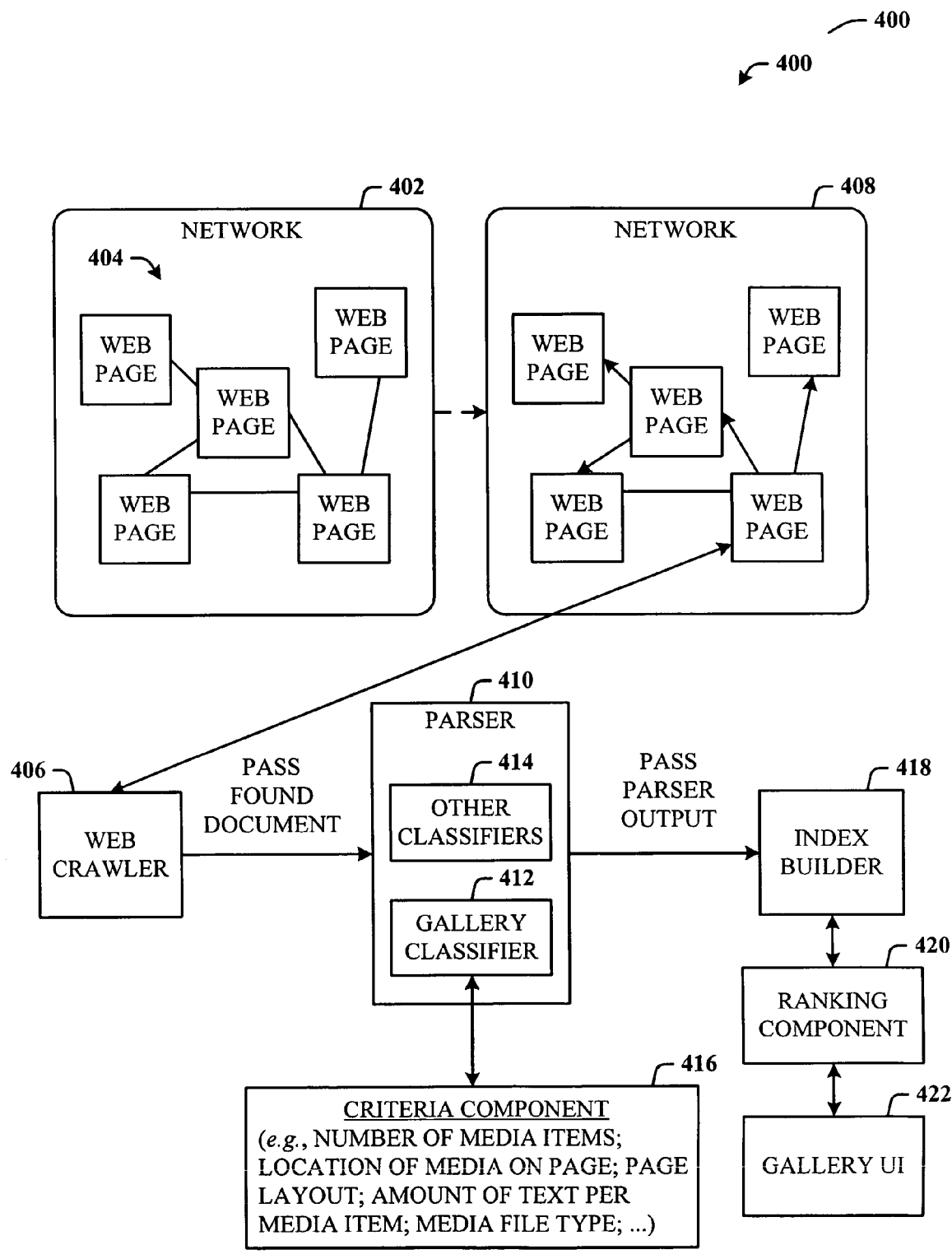
FIG. 4 illustrates a more detailed schematic block diagram of a system that facilitates gallery searching processing according to an aspect.

FIG. 4 illustrates a more detailed schematic block diagram of a system 400 that facilitates gallery searching processing according to an aspect. A network 402 of one or more web sites 404 having one or more web pages that are accessible during a search operation. A web crawler 406 receives and processes a query against the network of web sites 404, as shown at 408. The web crawler 406 feeds documents to a parser 410 to parse page data for structure. In this implementation, the parser 410 includes a gallery classifier 412 as well as other classifiers 414 that function to detect other types of content.

The media gallery classifier 412 is used to identify galleries when web pages are being parsed. A classifier, when employed in a search engine, is an added component used to identify certain types of pages. For example, in searches today, other classifiers such as a spam classifier and an adult content classifier can be provided to identify pages that are considered spam. This innovation expands the classifier functionality to also include the gallery classifier 412 to identify gallery pages. A gallery is a page that focuses on the media it contains (e.g., image, video, audio), is used mainly for browsing, and has a user experience centered on the media itself. The gallery classifier 412 is included into the crawler/parser/builder pipeline processes of a search to process structure data after the parsing is complete. Once the structure of the page is known from the parser 410, that information is fed into the gallery classifier 412 to make an informed guess at to whether or not a page is a gallery page.

A criteria component 416 interfaces to the gallery classifier 412 to allow access to predetermined criteria stored therein. For example, the predetermined criteria can include analyzing the number of media items on a page, the location of the media on a page, the page layout, the amount of text per media item, and the media file type, and the number files with similar file name text, for example. Thus, once the page structure is obtained, the structure data can be processed by the gallery classifier 412 using the criteria of the criteria component 416.

Classification is based on the determined page characteristics. For example, a web page that might be considered a gallery could have over thirty images of all the same size and located in an HTML (hypertext markup language) table. Alternatively, a gallery may be a DHTML (dynamic HTML) web page that contains many similarly-sized image thumbnails which expand to full images when the user hovers a pointing device cursor over a thumbnail image. Likewise, a video gallery page could be a page with many video links, all with similar formatting and description length. An audio gallery could be a list of audio files with similar formats and all with some associated text. Characteristics that are found to be common to galleries will then be included in the criteria component 416 as part of the gallery classifier system 412.

When the gallery classifier 412 determines that there is a high likelihood that the page is a gallery page, this information is passed from the parser to an index builder 418 which builds an index of the gallery pages. The index of gallery information can be ranked and/or gallery data pulled from the index builder 418 can be ranked using a ranking component 420 prior to representation via a gallery interface 422, which presents gallery page information to a user.

Figure 5:
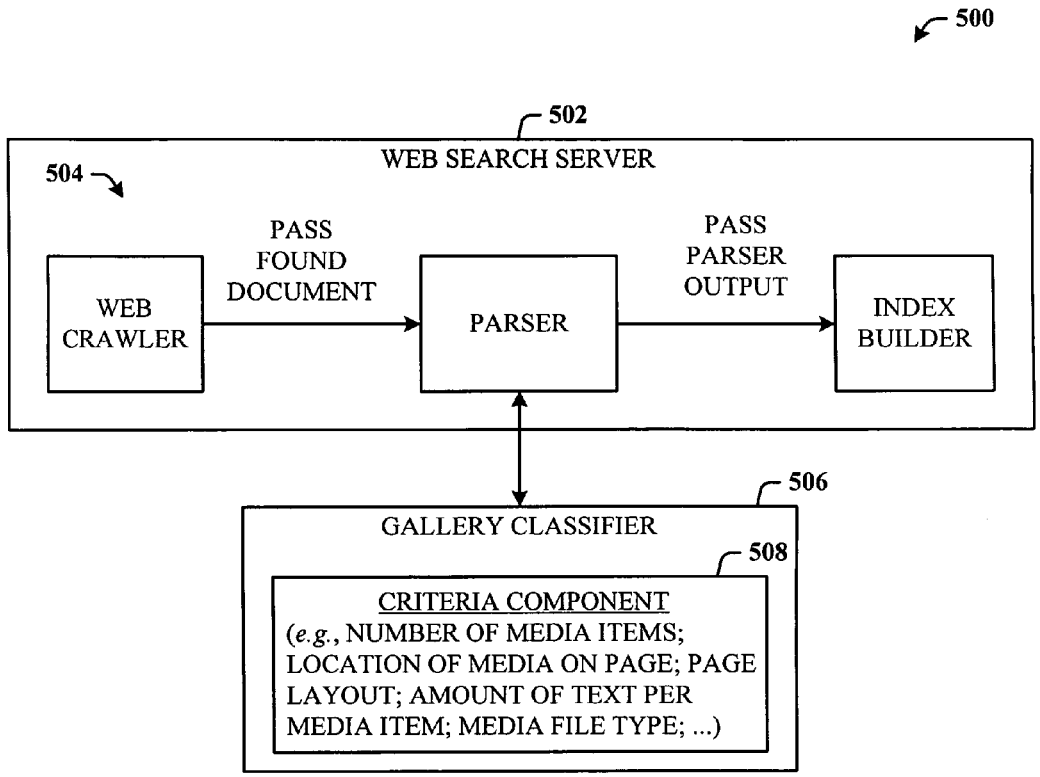
FIG. 5 illustrates an alternative implementation of a server-based gallery search system according to an aspect.

FIG. 5 illustrates an alternative implementation of a server-based gallery search system 500 according to an aspect. Here, the system 500 is employed on a network search server 502. The pipeline 504 includes the crawler, parser and builder, but a gallery classifier 506 is remote from the server 502. Additionally, the gallery classifier 506 includes a criteria component 508 that provides a default set of criteria, and other criteria that can be added.

Figure 6:
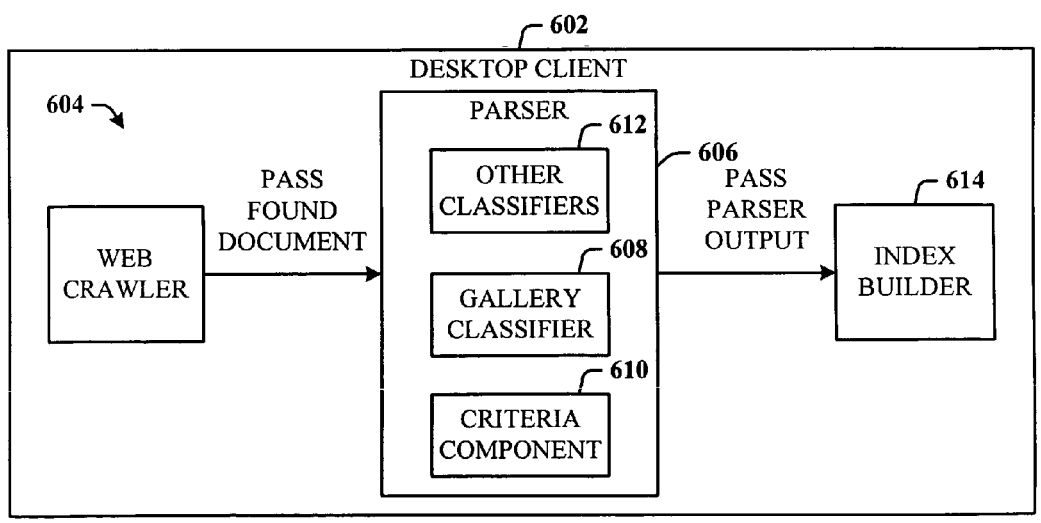
FIG. 6 illustrates an implementation of a client-based gallery search system according to an aspect.

FIG. 6 illustrates an implementation of a client-based gallery search system 600 according to an aspect. Here, the system 600 can be employed on a desktop computing system 602, portable computer, portable wireless device, or the like.

The desktop system 602 includes a crawler/parse/builder pipeline 604, where, in this case, a parser 606 also can include a gallery classifier 608, a criteria component 610, and other classifiers 612. Parser output is as described herein, passed to an index builder 614 for index building, and ultimately, presentation via a gallery UI.

Figure 7:
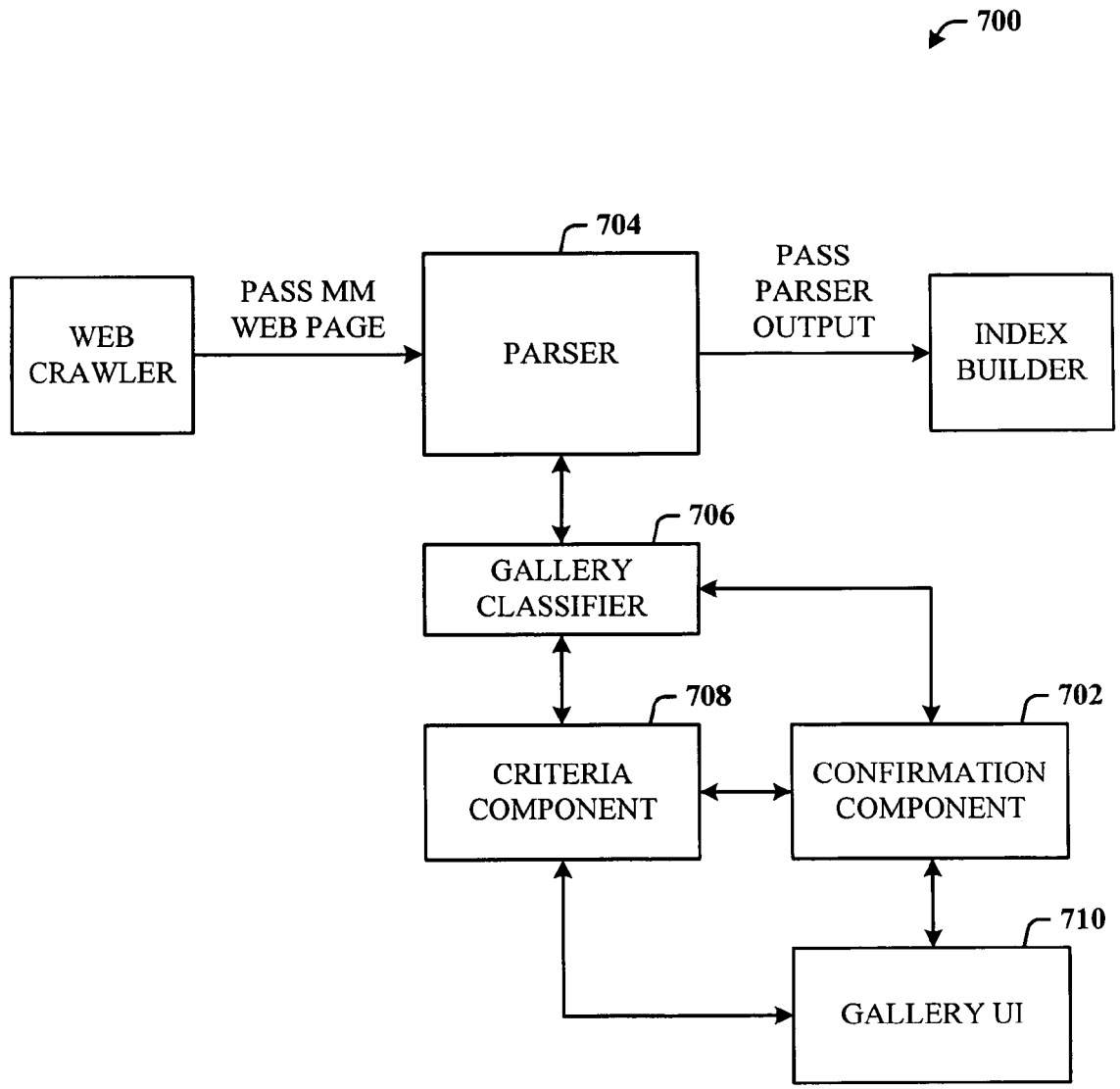
FIG. 7 illustrates an implementation of a search engine pipeline system which includes a confirmation component in accordance with another aspect.

FIG. 7 illustrates an implementation of a search engine pipeline system 700 which includes a confirmation component 702 in accordance with another aspect. Here, the system 700 includes a parser 704 that interfaces to an external gallery classifier 706, and which classifier 706 that further interfaces to a criteria component 708 for criteria access and processing. The confirmation component 702 monitors many different characteristics in order to determine if a gallery page returned from a search could actually be a gallery page. For example, click behavior in a web page can be monitored. Click behavior from a sample of users can be construed as an indication that a page is or is not a gallery page. If most or all of the presented images get clicked on, then they are all perhaps of similar content inferring that this could be a gallery page. If the click activity is high once the page is classified as a gallery page, this also can be a confirmation or validation that that the page is a gallery page.

The confirmation component 702 interfaces to the criteria component 708 to pass confirmation data thereto as new criteria data to be utilized by the classifier 706. The confirmation component 702 can interface to a gallery UI 710 to receive and process user interaction data (e.g., user click activity, user hover activity, . . . ), and then to pass UI and user activity information to the gallery classifier 706 for classification processing to help in determining if a web page is a gallery page.

Figure 8:
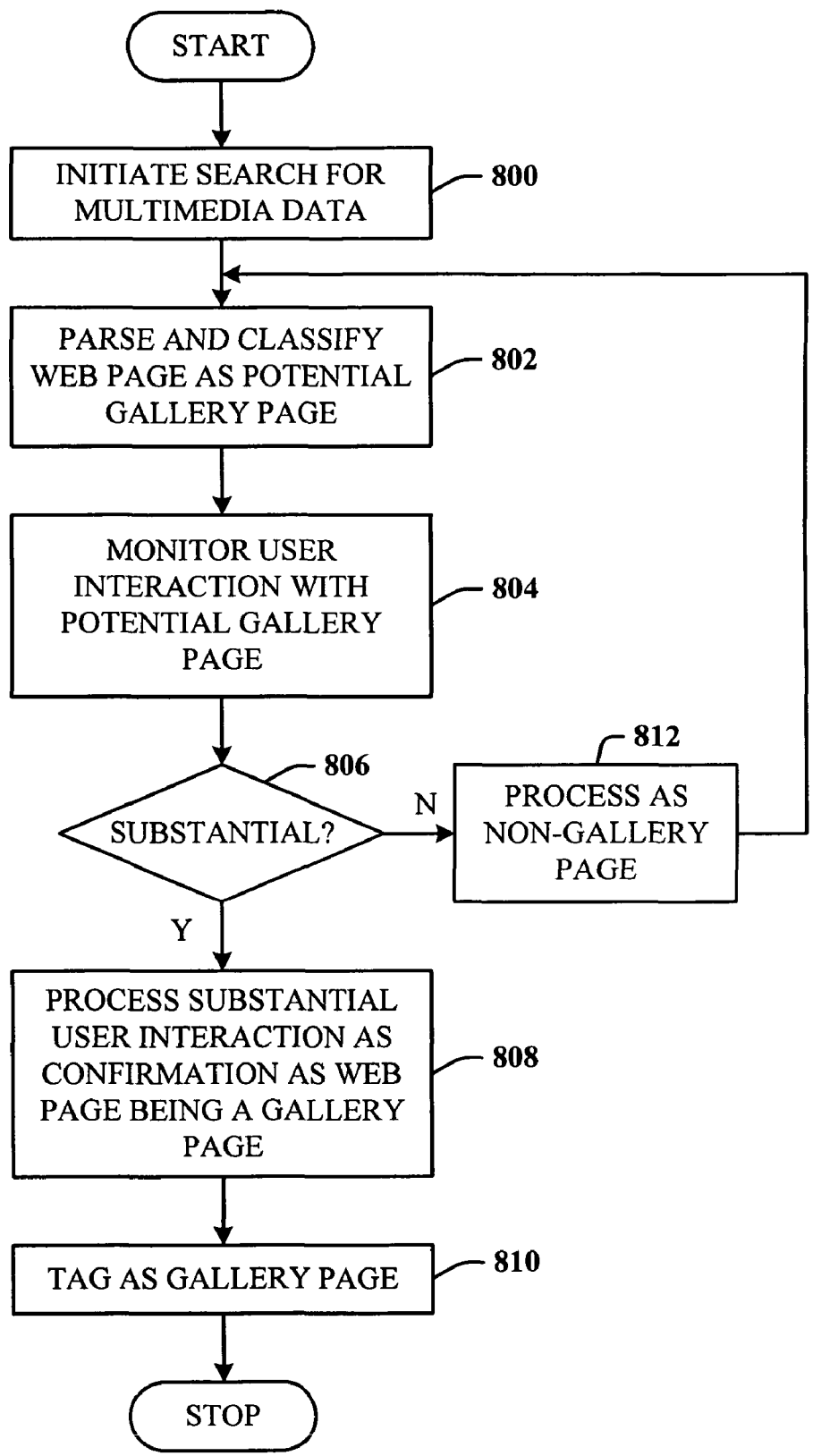
FIG. 8 illustrates a methodology of processing user interaction data as confirmation that a web page could be a gallery page in accordance with the disclosed innovation.

Referring now to FIG. 8, there is illustrated a methodology of processing user interaction data as confirmation that a web page could be a gallery page in accordance with the disclosed innovation. At 800, a search for multimedia content is initiated. At 802, a received web page is parsed and classified as a potential gallery page. At 804, user interaction is monitored with the potential gallery page. At 806, the system determines if the user interaction is sufficiently substantial based on a predetermined interaction value to warrant classifying the page as a gallery page. If so, at 808, the user interaction is processed as confirmation that the web page is a gallery page. At 810, the gallery page can then be tagged as a gallery page for results ranking and processing. If the user interaction is not substantial, flow is from 806 to 812 to process the page as a non-gallery page, and flow then proceeds back to 802 to parse and begin classification of the next page.

Figure 9:
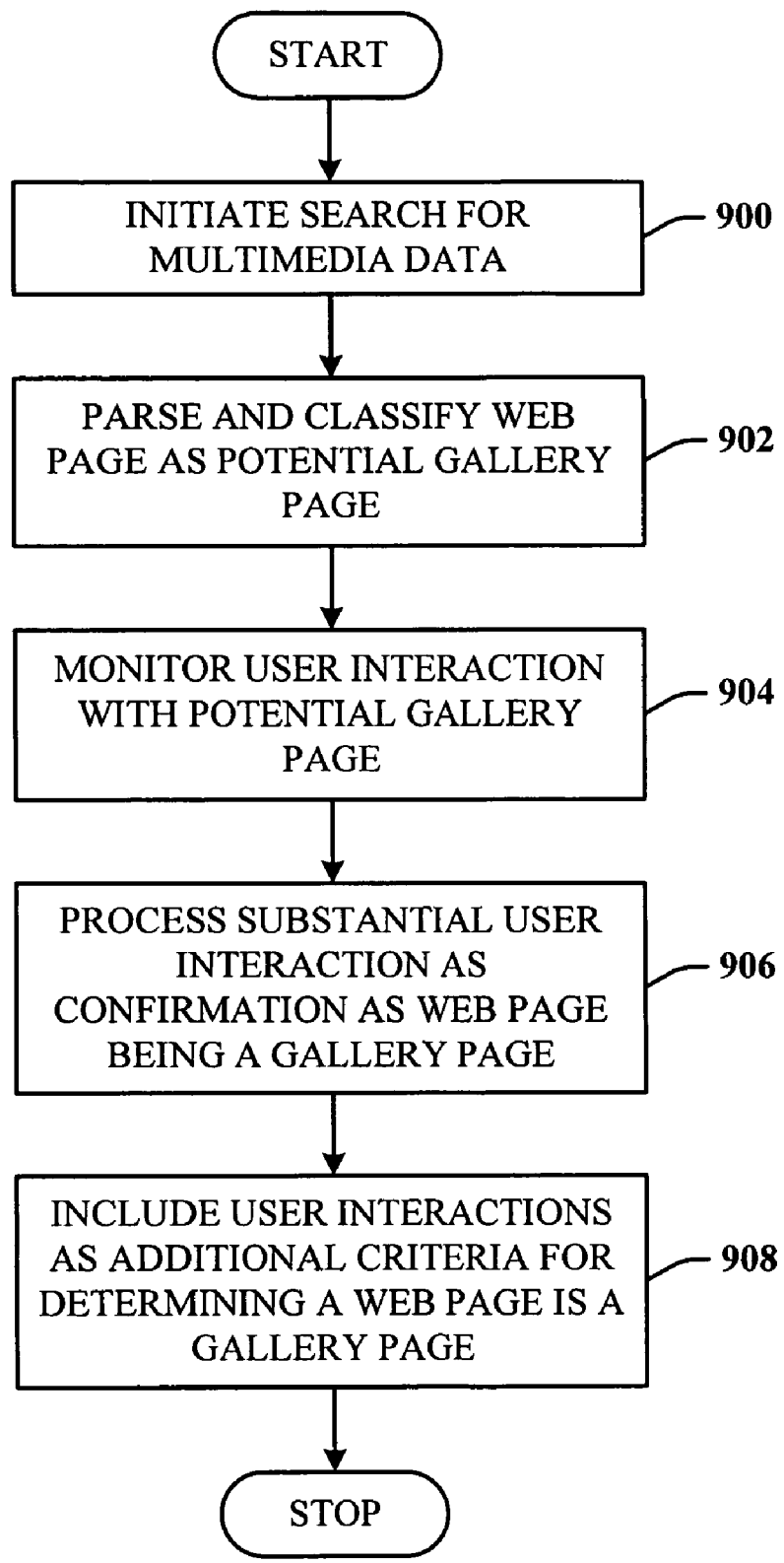
FIG. 9 illustrates a methodology of processing user interaction as confirmation that a web page is a gallery page according to an aspect.

FIG. 9 illustrates a methodology of processing user interaction as confirmation that a web page is a gallery page according to an aspect. At 900, a search is initiated for multimedia content. At 902, a received web page is parsed and classified as a potential gallery page. At 904, user interaction with the potential gallery page is monitored. At 906, substantial user interaction is processed as confirmation that the web page is a gallery page. At 908, the user interaction can be included as additional criteria to be considered by the gallery classifier when determining if a web page is a gallery page.

Figure 10:
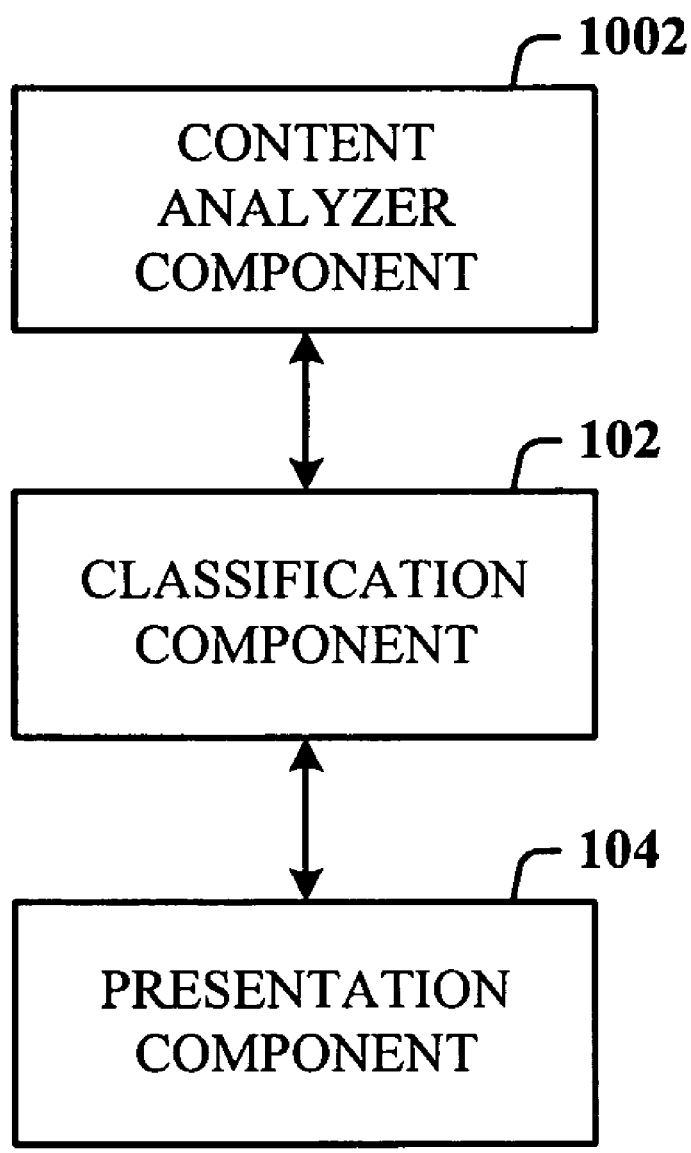
FIG. 10 illustrates a gallery classification and presentation system that employs a content analyzer component according to an aspect.

FIG. 10 illustrates a gallery classification and presentation system 1000 that employs a content analyzer component 1002 according to an aspect. As a means to further facilitate gallery page classification, the content analyzer component 1002 can be utilized to analyze image, video content, and/or audio content of a multimedia web page. For example, analysis of all images in the gallery can be performed to determine if the images have a face or faces in them or there are graphics in them implying that they may be clipart. In another implementation, analysis can be to a level of face recognition to determine who is actually in an image or video content. In yet another example, audio analysis can be performed and text recognition can be performed on any text of the web page. Thus, face detection, face recognition, audio analysis (e.g., all music), text OCR'ing (optical character recognition processing), text analysis, orientation analysis for images and videos, etc., can all factor in to help in determining whether the web page is a gallery page.

Figure 11:
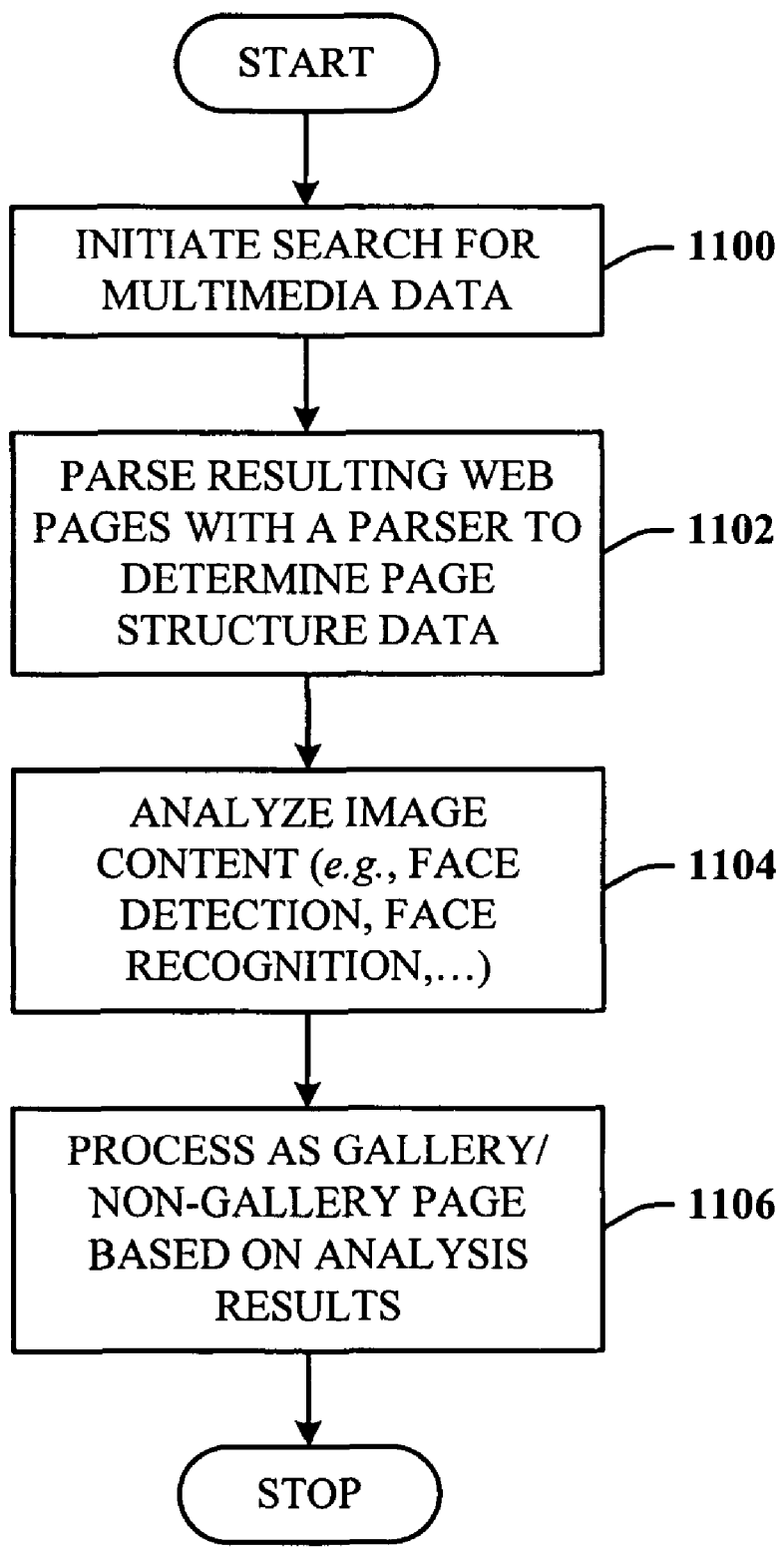
FIG. 11 illustrates a methodology of analyzing image content of a web page for classification purposes according to an aspect.

FIG. 11 illustrates a methodology of analyzing image content of a web page for classification purposes according to an aspect. At 1100, a search is initiated for multimedia content. At 1102, a received web page is parsed into structure data. At 1104, image analysis is performed on image content (e.g., face recognition, face detection . . . ). At 1106, based on the analysis results, the web page is classified as either a gallery page or a non-gallery page.

Figure 12:
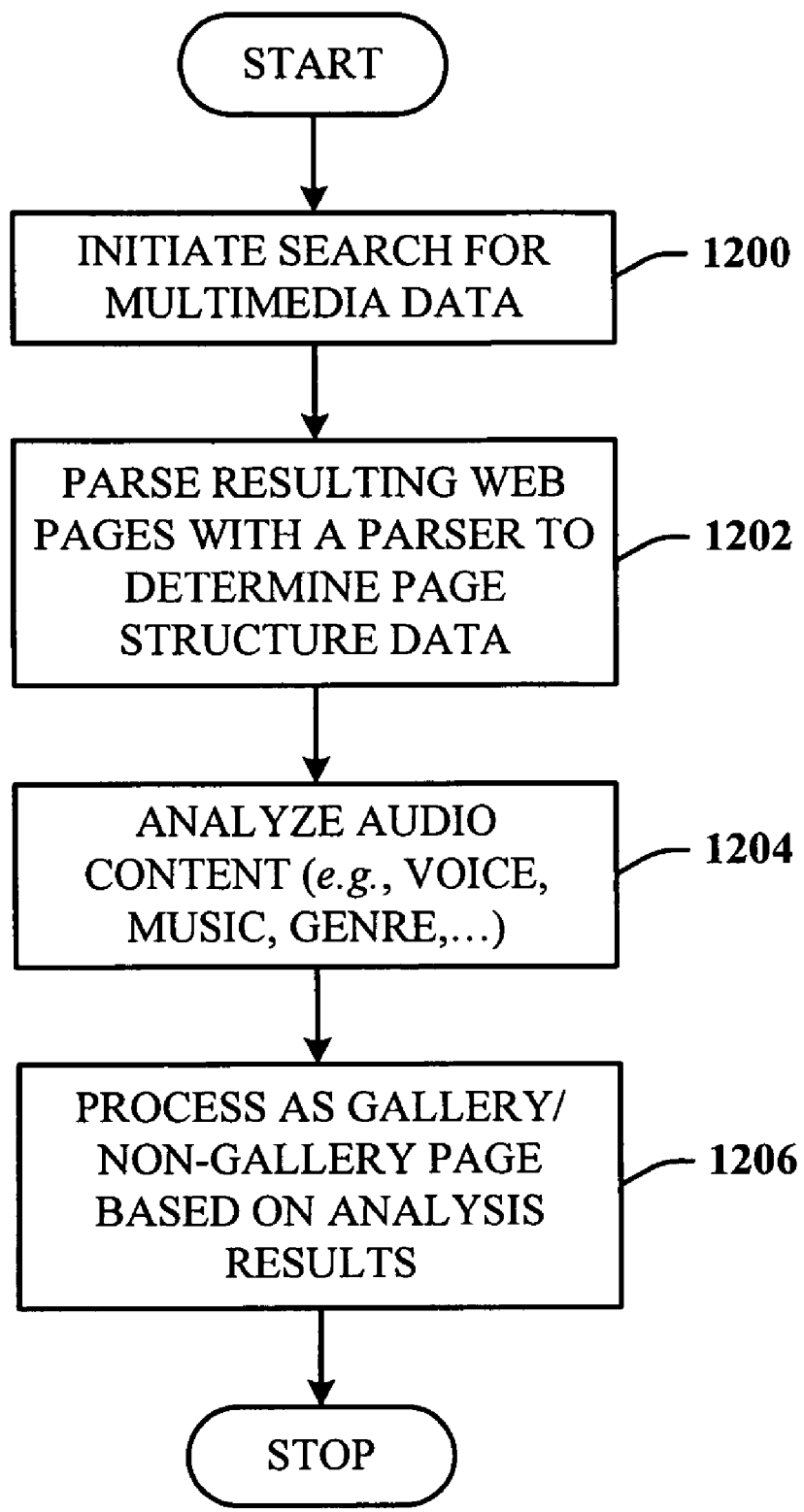
FIG. 12 illustrates a methodology of analyzing audio content of a web page for classification purposes according to an aspect.

FIG. 12 illustrates a methodology of analyzing audio content of a web page for classification purposes according to an aspect. At 1200, a search is initiated for multimedia content. At 1202, a received web page is parsed into structure data. At 1204, audio analysis is performed on audio content (e.g., voice, music, instrumental, style, genre . . . ). At 1206, based on the analysis results, the web page is classified as either a gallery page or a non-gallery page.

Figure 13:
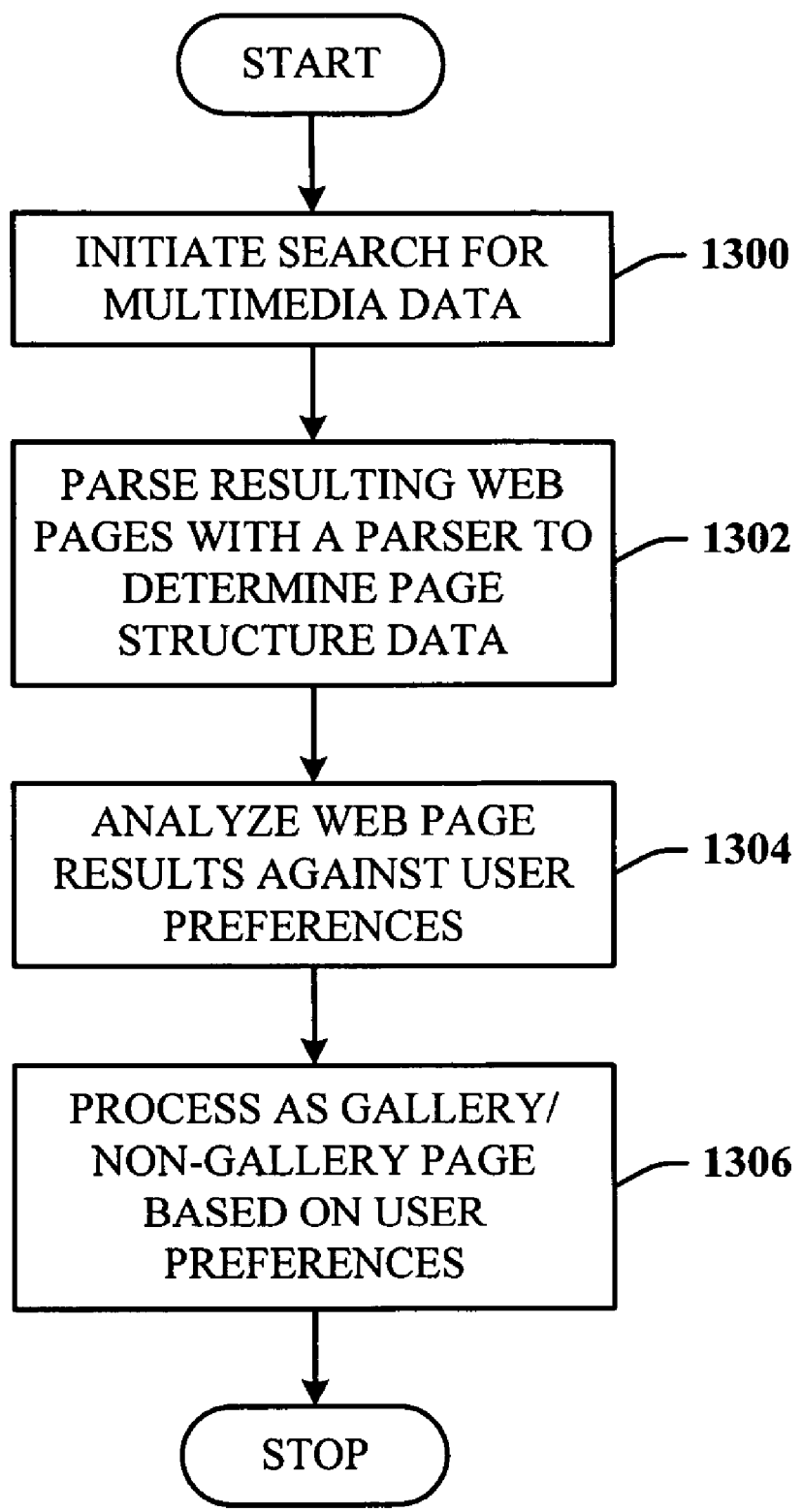
FIG. 13 illustrates a methodology of filtering web page results based on user preferences for classification purposes as a gallery page according to an aspect.

FIG. 13 illustrates a methodology of filtering web page results based on user preferences for classification purposes as a gallery page according to an aspect. At 1300, a search is initiated for multimedia content. At 1302, a received web page is parsed into structure data. At 1304, page processing is performed against user preferences. The user preferences can be one or more rules that are employed to limit the types of web sites that will be returned as results, for example. Additionally, the user preferences can be given more weight in how the results are ranked for processing and/or ultimate presentation. At 1306, based on the user preference information, the web page is classified as either a gallery page or a non-gallery page.

Figure 14:
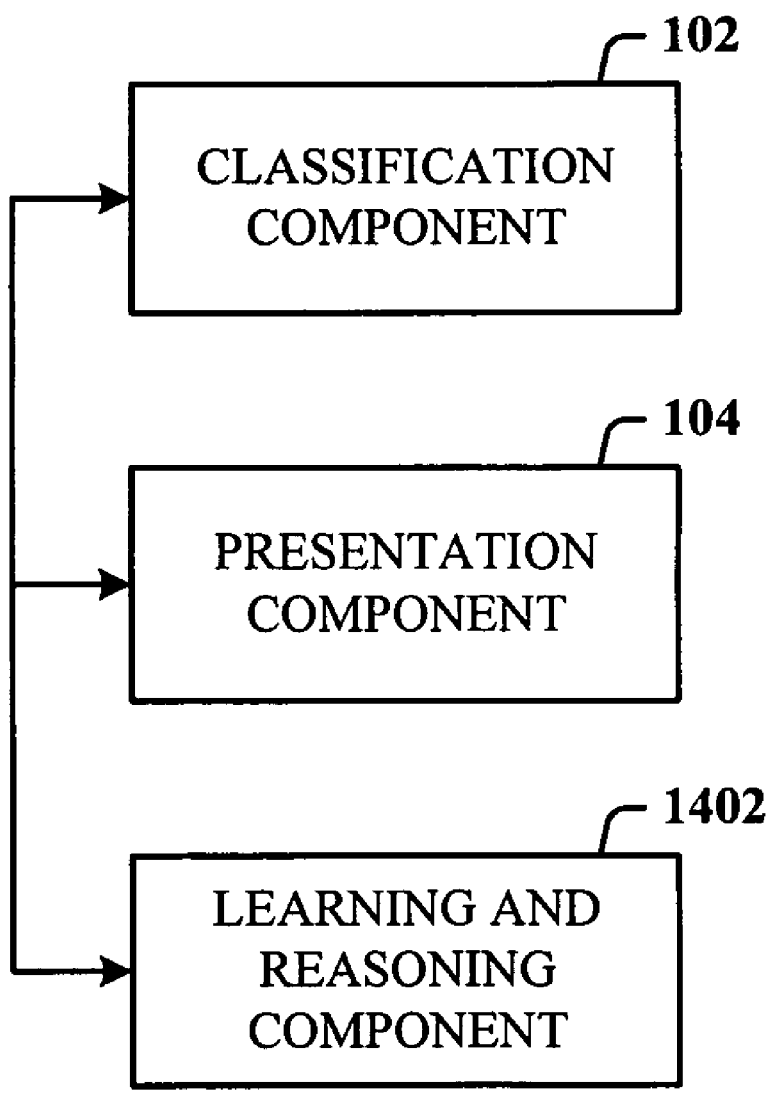
FIG. 14 illustrates a system that employs a machine learning and reasoning component which facilitates automating one or more features in accordance with the subject innovation.

FIG. 14 illustrates a system 1400 that employs a machine learning and reasoning (LR) component 1402 which facilitates automating one or more features in accordance with the subject innovation. The subject invention (e.g., in connection with criteria processing and selection) can employ various LR-based schemes for carrying out various aspects thereof.

A classifier, in this context of learning and reasoning, is a function that maps an input attribute vector, x=(x1, x2, x3, x4, xn), to a class label class(x). The classifier can also output a confidence that the input belongs to a class, that is, f(x) =confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions, including but not limited to determining according to a predetermined criteria when to employ content analysis, what content analysis should be employed for a given web page, what criteria should be considered for a gallery classification process (e.g., user preference, history file data, favorites data, . . . ), and so on. In another example, the LR component 1402 can monitor user interaction of a first user, and use this interaction data to affect gallery page classification in a manner that can be different from a second user.

In another example, the LR component 1402, when employed on a web search server, can monitor user activity and/or interaction of a large number of users, and cluster user data, as well as web page results based on confirmation data from the larger number of users. Subsequent access to those web addresses (or URLs) will result in a high probability that the web page is a gallery page, or not a gallery page.

This are only but a few examples of the learning and reasoning that can be gained from the LR component 1402 in the context of gallery page search processing in accordance with the subject innovation. It is within contemplation of this innovation that many more related functions can be processed for automation and learning. For example, the LR component can learn that repeated placement and/or orientation of images on a web page, and thereafter confirmed as a gallery page can be included as additional criteria that is feed back to the criteria component for consideration for gallery page classification.

Figure 15:
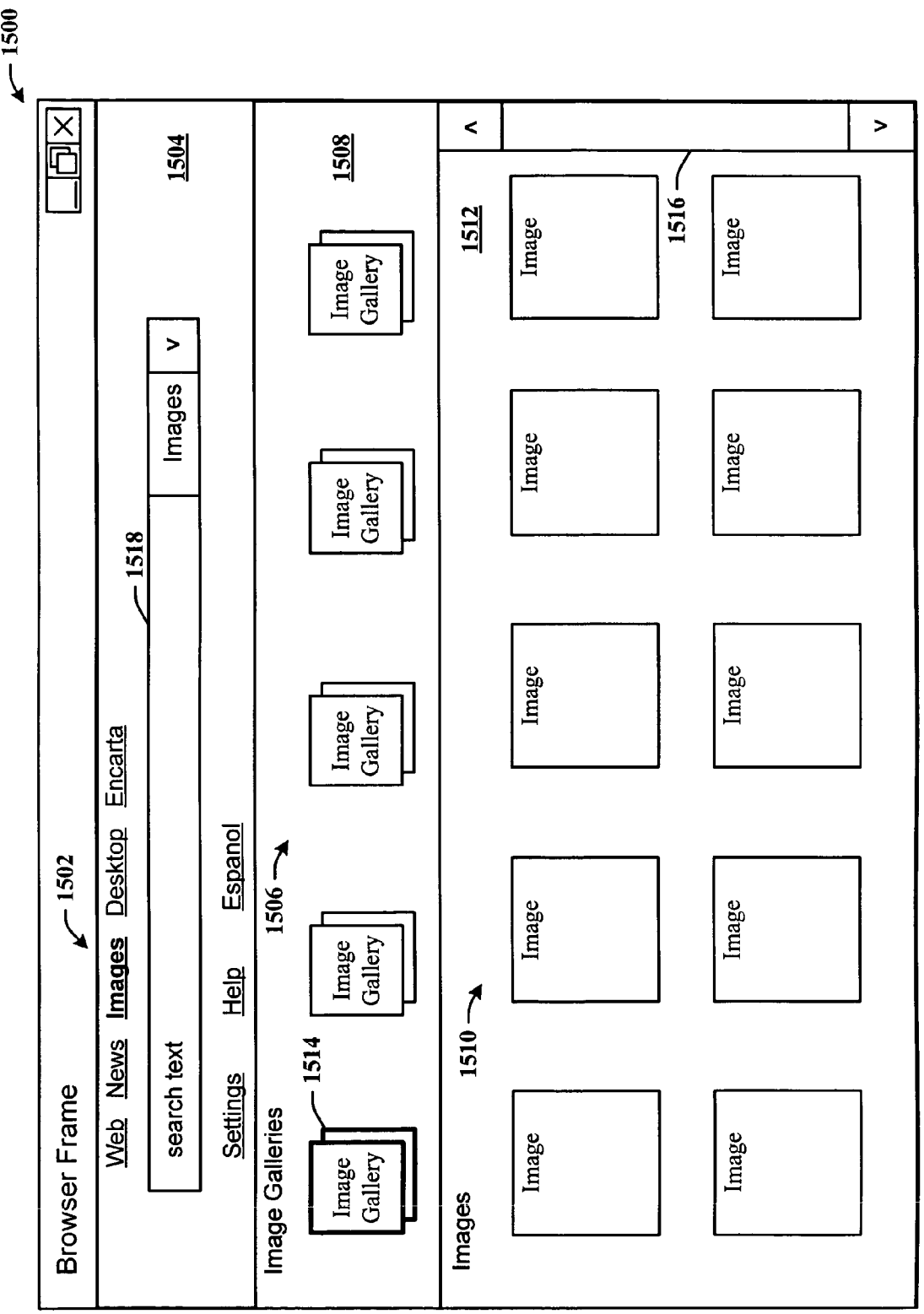
FIG. 15 illustrates an image gallery page UI for presenting gallery images in accordance with an innovative aspect.

FIG. 15 illustrates an image gallery page UI 1500 for presenting gallery images in accordance with an innovative aspect. Today, when a user searches for images (or audio or video), the user can get a page of thumbnail images which point to various other pages that are potentially text filled, news filled, or image filled, for example. If the user is looking to browse images/audio/video (a likely scenario considering the user explicitly interacted with the UI to search image content), then the user should be connected sooner to the desired end result of galleries.

A way of displaying the gallery results to a user is described. In the UI of FIG. 15, it can be seen that image galleries can be bubbled up to the top of the search results, and can be visually differentiated. This makes it easier for the user to quickly search and discover relevant browsing results. Additionally, the galleries can be called out as special and potentially more relevant than other search results (e.g., ranked). Furthermore, the user can manually configure the engine to only show relevant galleries.

The gallery page 1500 includes an Images selection 1502 in a selection area 1504 wherein once selected by the user, only gallery pages with image content will be presented. Here, the Images selection 1502 has been selected by the user, thereby causing presentation of only image content. Categories or groupings of image content are presented as graphical indicia 1506 in an Image Galleries section 1508. The graphical indicia 1506 can be presented as shadowed or double image offset graphics icons, for example, which can be selected to present corresponding individual sets or groups of images 1510 in a lower Images section 1512.

Here, a first image gallery group 1514 has been selected causing the associate images 1510 to be presented in a reduced format in the Images section 1512. The user can scroll through the associated images 1512 via a scroll bar 1516. The selected first gallery group 1514 can be presented to the user in any number of different ways, as being the gallery group that was selected. For example, the first group icon 1514 can be presented as bolded, or colored in a different way, for example.

The selection area 1504 illustrated includes various user selections, as well as a search input box 1518 so that the user can search the presented set of images 1510 according to text or other metadata that can be associated with each of the images 1510.

Figure 16:
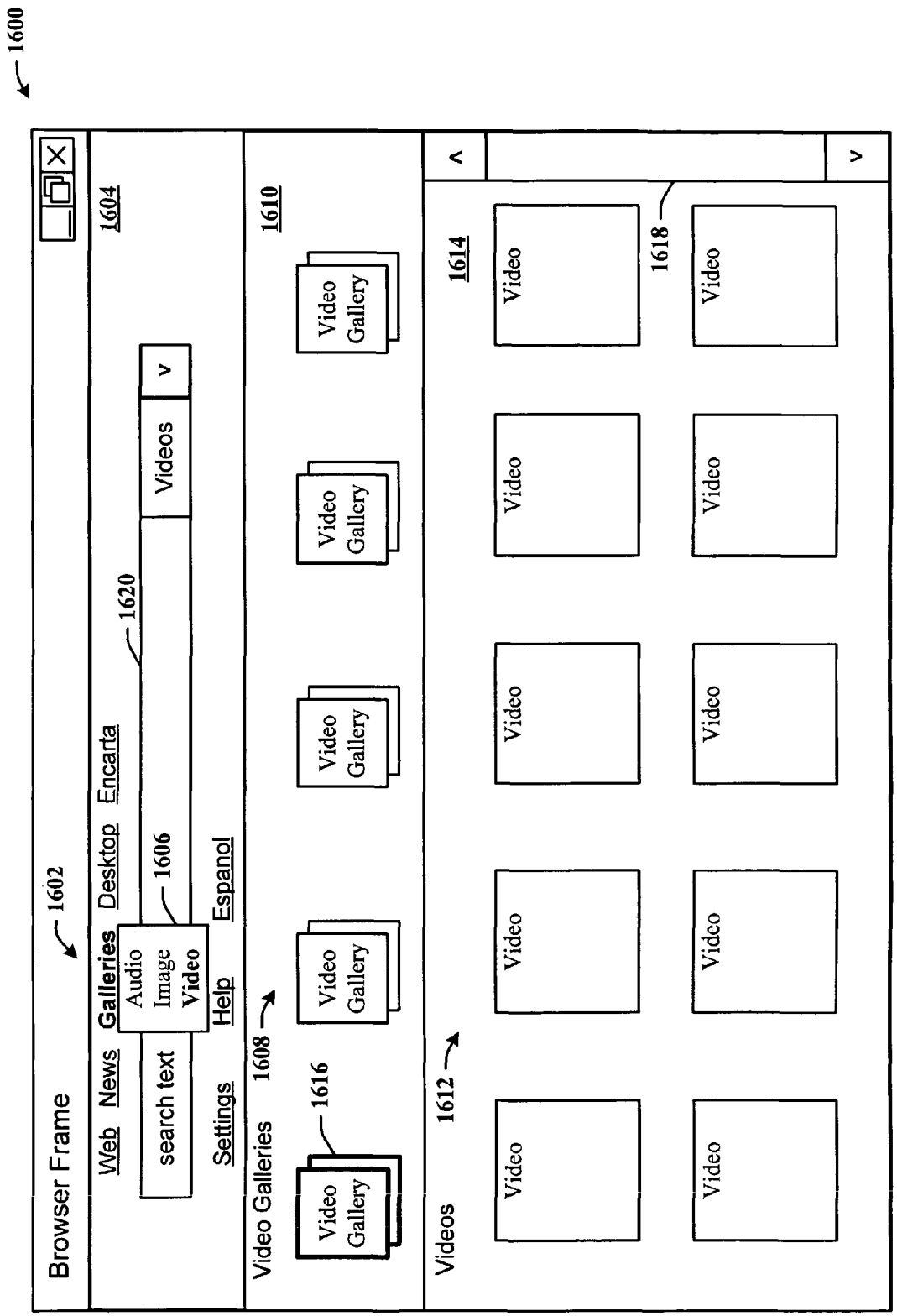
FIG. 16 illustrates a video gallery page UI for presenting gallery video content in accordance with an innovative aspect.

FIG. 16 illustrates a video gallery page UI 1600 for presenting gallery video content in accordance with an innovative aspect. In the UI of FIG. 16, it can be seen that video galleries can be bubbled up to the top of the search results, and can be visually differentiated. This makes it easier for the user to quickly search and discover relevant browsing results. Additionally, the galleries can be called out as special and potentially more relevant than other search results (e.g., ranked). Furthermore, the user can manually configure the engine to only show relevant galleries.

The gallery page 1600 includes a Galleries selection 1602 in a selection area 1604 wherein once selected by the user, only gallery pages will be presented. This made possible by a drop-down menu 1606 that is activated when the user either selects the Galleries selection or hovers over the Galleries selection with a pointing device cursor, for example. Here, the Video gallery selection from the menu 1606 has been selected by the user, thereby causing presentation of only video gallery content. Categories or groupings of video content are presented as graphical indicia 1608 in a Video Galleries section 1610. The graphical indicia 1608 can be presented as shadowed or double image offset graphics icons, for example, which can be selected to present corresponding individual sets or groups of video files 1612 in a lower Video section 1614.

Here, a first video gallery group 1616 has been selected causing the associated video content (depicted with icon or video snapshots for example) 1612 to be presented in a reduced format in the Video section 1614. The user can scroll through the associated images icons 1612 via a scroll bar 1618. The selected first gallery group 1616 can be presented to the user in any number of different ways, as being the gallery group that was selected. For example, the first group icon 1616 can be presented as bolded, or colored in a different way, for example.

The selection area 1604 illustrated includes various user selections, as well as a search input box 1620 so that the user can search the presented set of video files according to text or other metadata that can be associated with each of the video graphical representations 1612.

Figure 17:
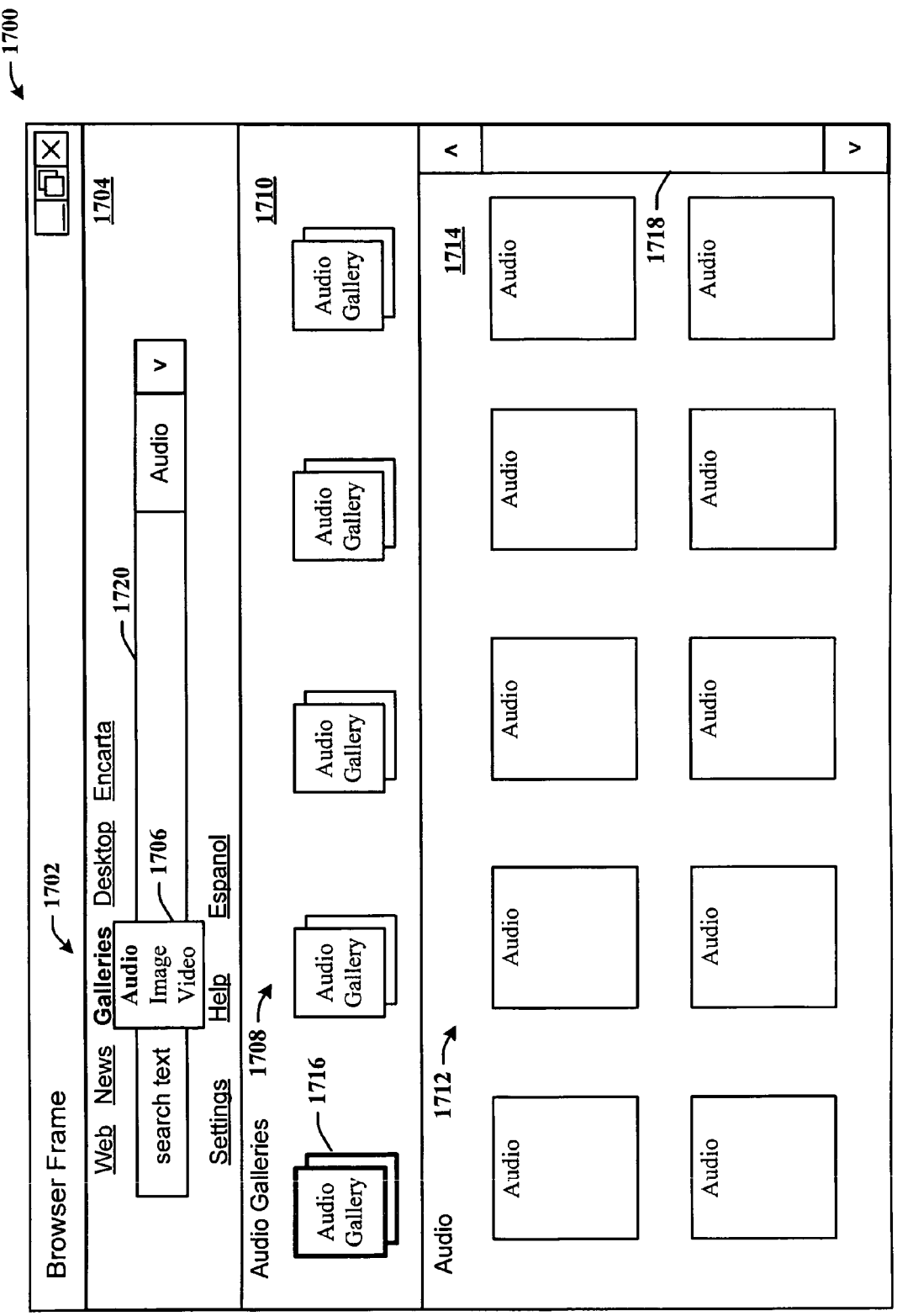
FIG. 17 illustrates an audio gallery page UI for presenting gallery audio content in accordance with an innovative aspect.

FIG. 17 illustrates an audio gallery page UI 1700 for presenting gallery audio content in accordance with an innovative aspect. In the UI of FIG. 17, it can be seen that audio galleries can be bubbled up to the top of the search results, and can be visually differentiated. This makes it easier for the user to quickly search and discover relevant browsing results. Additionally, the galleries can be called out as special and potentially more relevant than other search results (e.g., ranked). Furthermore, the user can manually configure the engine to only show relevant galleries.

The gallery page 1700 includes a Galleries selection 1702 in a selection area 1704 wherein once selected by the user, only gallery pages will be presented. This made possible by a drop-down menu 1706 that is activated when the user either selects the Galleries selection or hovers over the Galleries selection with a pointing device cursor, for example. Here, the Audio gallery selection from the menu 1706 has been selected by the user, thereby causing presentation of only audio gallery content. Categories or groupings of audio content are presented as graphical indicia 1708 in an Audio Galleries section 1710. The graphical indicia 1708 can be presented as shadowed or double image offset graphics icons, for example, which can be selected to present corresponding individual sets or groups of audio files 1712 in a lower Audio section 1714.

Here, a first audio gallery group 1716 has been selected causing the associated audio content (depicted with icon or image snapshots for example) 1712 to be presented in a reduced format in the Audio section 1714. The user can scroll through the associated audio icons 1712 via a scroll bar 1718. The selected first gallery group 1716 can be presented to the user in any number of different ways, as being the gallery group that was selected. For example, the first group icon 1716 can be presented as bolded, or colored in a different way, for example.

The selection area 1704 illustrated includes various user selections, as well as a search input box 1720 so that the user can search the presented set of audio files according to text or other metadata that can be associated with each of the audio file graphical representations 1712.

Figure 18:
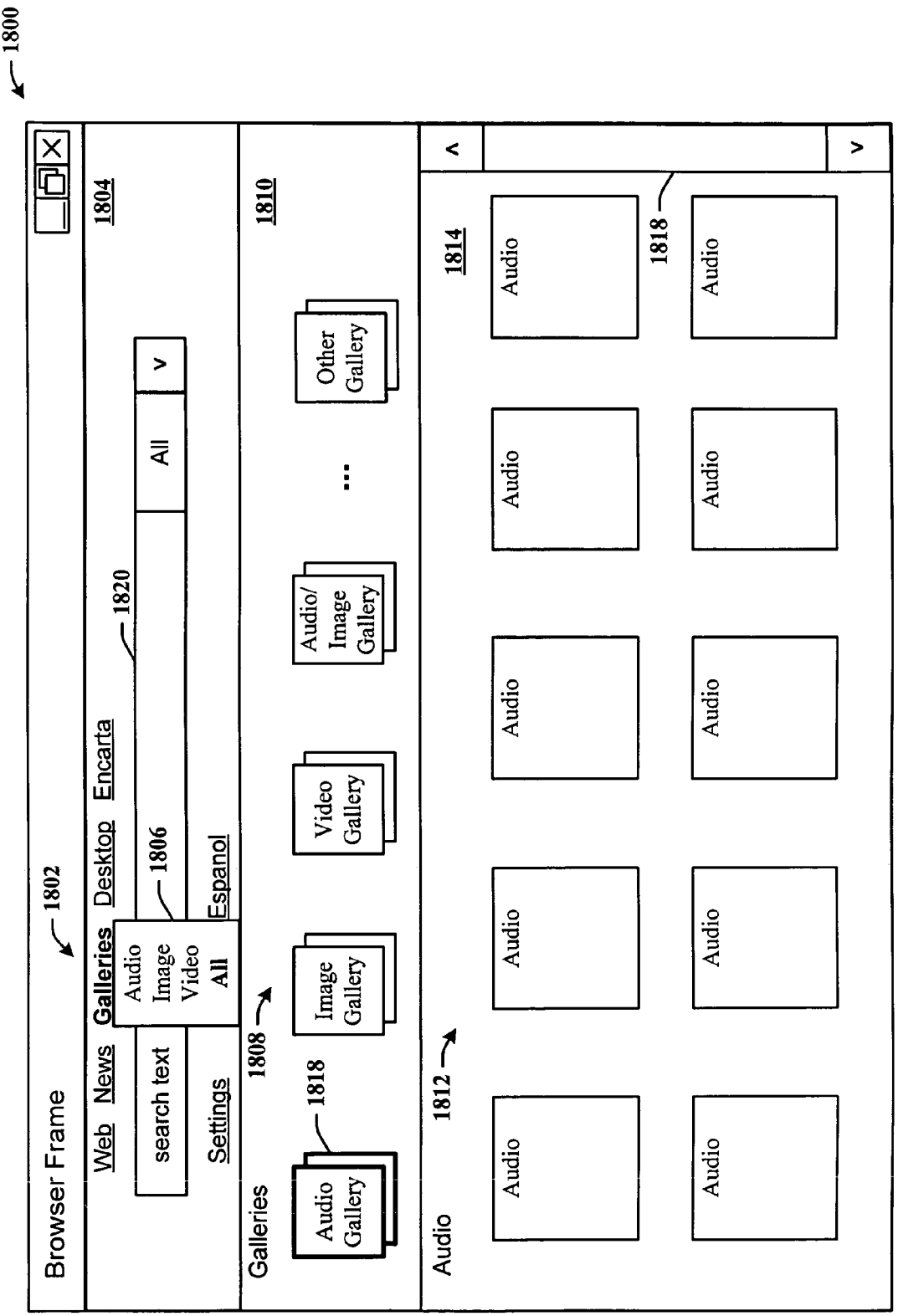
FIG. 18 illustrates a gallery page UI for presenting all gallery content in accordance with an innovative aspect.

FIG. 18 illustrates a gallery page UI 1800 for presenting all gallery content in accordance with an innovative aspect. In the UI of FIG. 18, it can be seen that audio, video, and image galleries can be bubbled up to the top of the search results, and can be visually differentiated. This makes it easier for the user to quickly search and discover relevant browsing results. Additionally, the galleries can be called out as special and potentially more relevant than other search results (e.g., ranked). Furthermore, the user can manually configure the engine to only show relevant galleries.

The gallery page 1800 includes a Galleries selection 1802 in a selection area 1804 wherein once selected by the user, only gallery pages will be presented. This made possible by a drop-down menu 1806 that is activated when the user either selects the Galleries selection or hovers over the Galleries selection with a pointing device cursor, for example. Here, the All gallery selection from the menu 1806 has been selected by the user, thereby causing presentation of all gallery content. Categories or groupings of gallery content are presented as graphical indicia 1808 in a Galleries section 1810. The graphical indicia 1808 can be presented as shadowed or double image offset graphics icons, for example, which can be selected to present corresponding individual sets or groups of gallery files 1812 in a lower content type section 1814.

Here, a first audio gallery group 1818 has been selected causing the associated audio content (depicted with icon or image snapshots for example) 1812 to be presented in a reduced format in the type section 1814. The user can scroll through the associated audio icons 1812 via a scroll bar 1818. The selected first gallery group 1816 can be presented to the user in any number of different ways, as being the gallery group that was selected. For example, the first group icon 1816 can be presented as bolded, or colored in a different way, for example.

The selection area 1804 illustrated includes various user selections, as well as a search input box 1820 so that the user can search the presented set of audio files according to text or other metadata that can be associated with each of the audio file graphical icon representations 1812.

Figure 19:
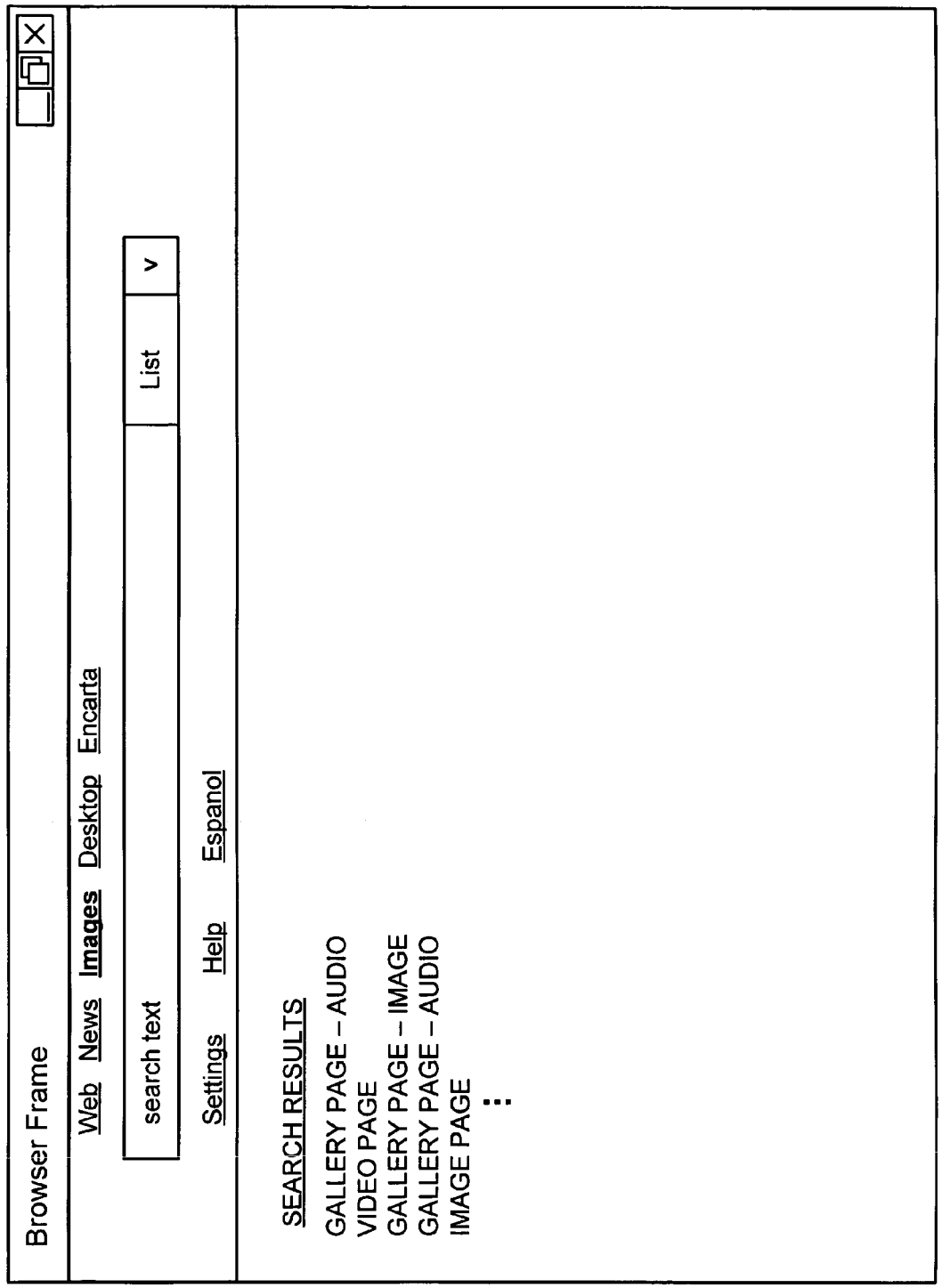
FIG. 19 illustrates a gallery page UI for presenting all gallery content as a listing in accordance with an innovative aspect.

FIG. 19 illustrates a gallery page UI 1900 for presenting all gallery content as a listing in accordance with an innovative aspect. In the UI of FIG. 19, it can be seen that audio, video, and image galleries can be bubbled up to the top of the search results, and can be visually differentiated. This makes it easier for the user to quickly search and discover relevant browsing results. Additionally, the galleries can be called out as special and potentially more relevant than other search results (e.g., ranked). Furthermore, the user can manually configure the engine to only show relevant galleries.

Instead of configuring the UI to present graphical icons for gallery content, the user can select a tabular representation. Here, the multimedia search results are listed near the top of the listing, and have been identified and classified as gallery content or non-gallery content. For example, two sets of audio gallery pages have been listed, as well as an image gallery page, and two non-gallery pages. The user can select a single file or multiple files for presentation in accordance with the previous web page UI's provided supra.

Figure 20:
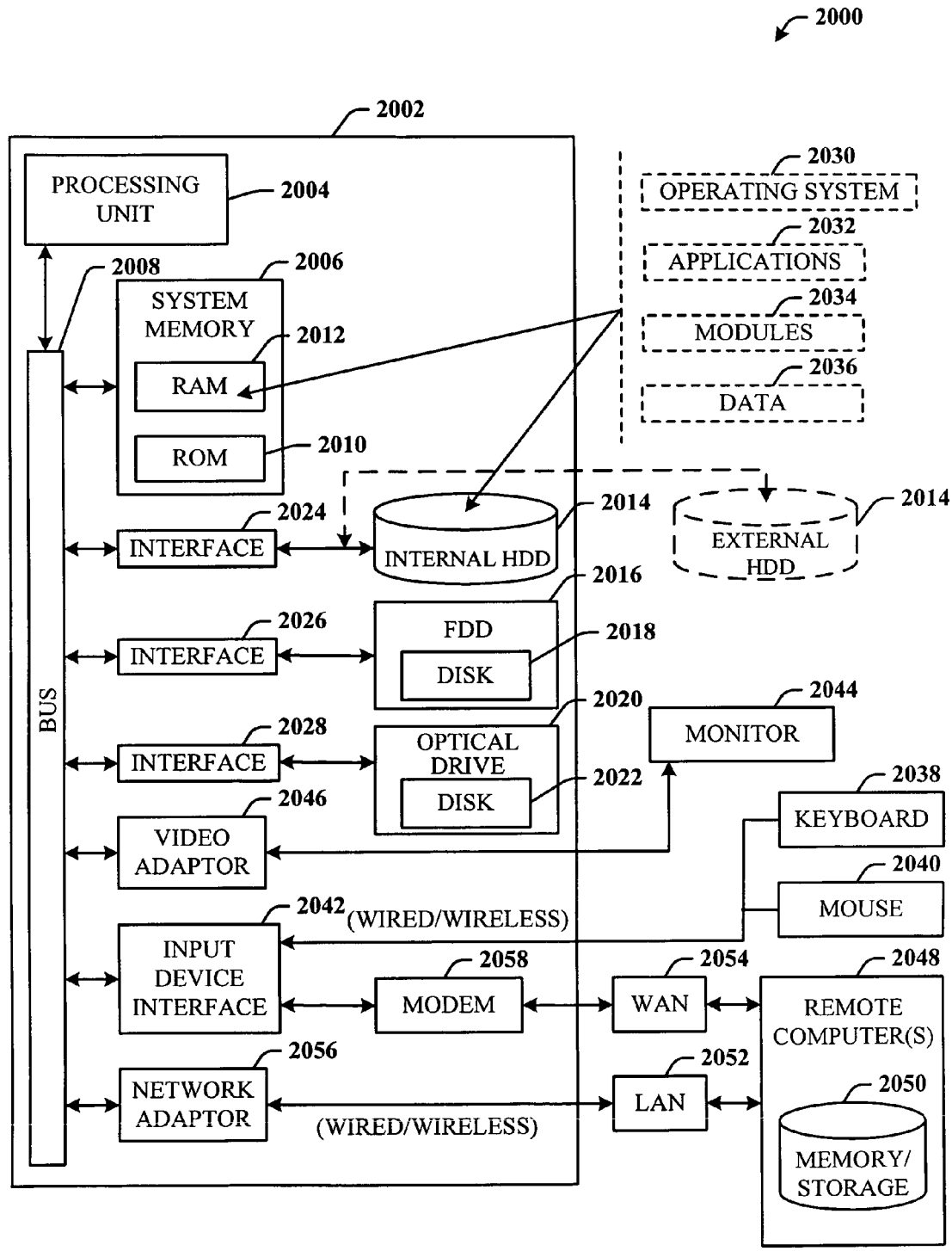
FIG. 20 illustrates a block diagram of a computer operable to execute gallery page searching, classification and presentation in accordance with a novel aspect.

Referring now to FIG. 20, there is illustrated a block diagram of a computer operable to execute gallery page searching, classification and presentation in accordance with a novel aspect. In order to provide additional context for various aspects thereof, FIG. 20 and the following discussion are intended to provide a brief, general description of a suitable computing environment 2000 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 20, the exemplary environment 2000 for implementing various aspects includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures may also be employed as the processing unit 2004.

The system bus 2008 can be any of several types of bus structure that may further interconnect to a memory bus (with or without a memory controller), a peripheral bus, and a local bus using any of a variety of commercially available bus architectures. The system memory 2006 includes read-only memory (ROM) 2010 and random access memory (RAM) 2012. A basic input/output system (BIOS) is stored in a non-volatile memory 2010 such as ROM, EPROM, EEPROM, which BIOS contains the basic routines that help to transfer information between elements within the computer 2002, such as during start-up. The RAM 2012 can also include a high-speed RAM such as static RAM for caching data.

The computer 2002 further includes an internal hard disk drive (HDD) 2014 (e.g., EIDE, SATA), which internal hard disk drive 2014 may also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. It is to be appreciated that the innovation can be implemented with various commercially available operating systems or combinations of operating systems.

A user can enter commands and information into the computer 2002 through one or more wired/wireless input devices, e.g., a keyooard 2038 and a pointing device, such as a mouse 2040. Other input devices (not shown) may include a microphone, an IR remote control, a joystick, a game pad, a stylus pen, touch screen, or the like. These and other input devices are often connected to the processing unit 2004 through an input device interface 2042 that is coupled to the system bus 2008, but can be connected by other interfaces, such as a parallel port, an IEEE 1394 serial port, a game port, a USB port, an IR interface, etc.

A monitor 2044 or other type of display device is also connected to the system bus 2008 via an interface, such as a video adapter 2046. In addition to the monitor 2044, a computer typically includes other peripheral output devices (not shown), such as speakers, printers, etc.

The computer 2002 may operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which may connect to a global communications network, e.g., the Internet.

When used in a LAN networking environment, the computer 2002 is connected to the local network 2052 through a wired and/or wireless communication network interface or adapter 2056. The adaptor 2056 may facilitate wired or wireless communication to the LAN 2052, which may also include a wireless access point disposed thereon for communicating with the wireless adaptor 2056.

When used in a WAN networking environment, the computer 2002 can include a modem 2058, or is connected to a communications server on the WAN 2054, or has other means for establishing communications over the WAN 2054, such as by way of the Internet. The modem 2058, which can be internal or external and a wired or wireless device, is connected to the system bus 2008 via the serial port interface 2042. In a networked environment, program modules depicted relative to the computer 2002, or portions thereof, can be stored in the remote memory/storage device 2050. It will be appreciated that the network connections shown are exemplary and other means of establishing a communications link between the computers can be used.

The computer 2002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 21:
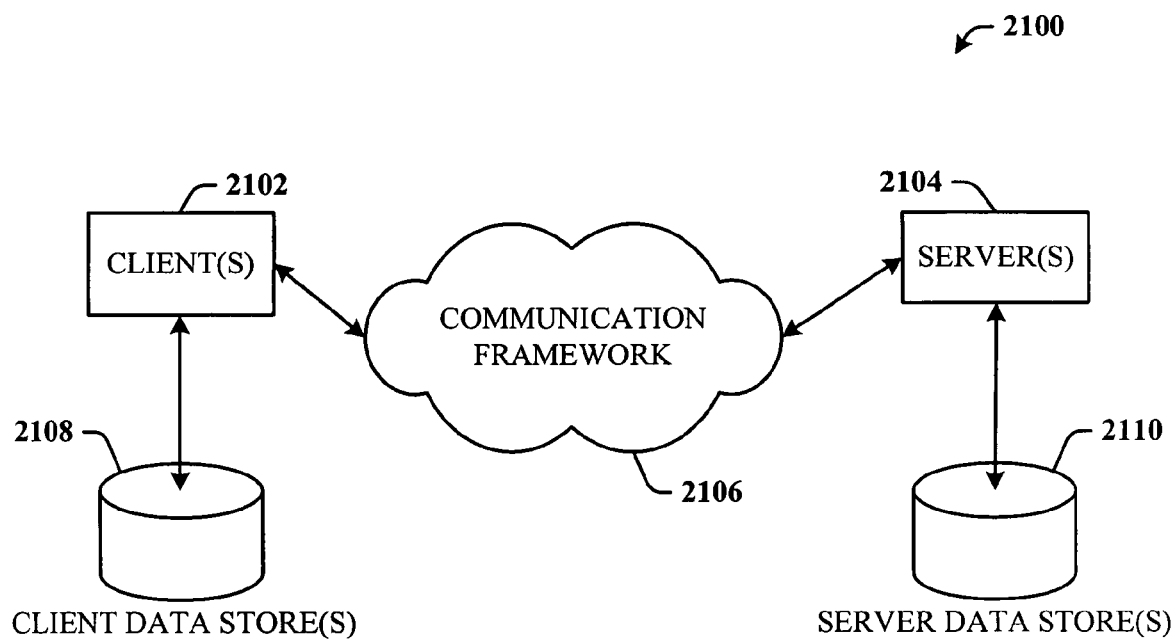
FIG. 21 illustrates a schematic block diagram of an exemplary computing environment that supports gallery page searching, classification and presentation in accordance with another aspect.

Referring now to FIG. 21, there is illustrated a schematic block diagram of an exemplary computing environment 2100 that supports gallery page searching, classification and presentation in accordance with another aspect. The system 2100 includes one or more client(s) 2102. The client(s) 2102 can be hardware and/or software (e.g., threads, processes, computing devices). The client(s) 2102 can house cookie(s) and/or associated contextual information by employing the subject innovation, for example.

The system 2100 also includes one or more server(s) 2104. The server(s) 2104 can also be hardware and/or software (e.g., threads, processes, computing devices). The servers 2104 can house threads to perform transformations by employing the invention, for example. One possible communication between a client 2102 and a server 2104 can be in the form of a data packet adapted to be transmitted between two or more computer processes. The data packet may include a cookie and/or associated contextual information, for example. The system 2100 includes a communication framework 2106 (e.g., a global communication network such as the Internet) that can be employed to facilitate communications between the client(s) 2102 and the server(s) 2104.

Communications can be facilitated via a wired (including optical fiber) and/or wireless technology. The client(s) 2102 are operatively connected to one or more client data store(s) 2108 that can be employed to store information local to the client(s) 2102 (e.g., cookie(s) and/or associated contextual information). Similarly, the server(s) 2104 are operatively connected to one or more server data store(s) 2110 that can be employed to store information local to the servers 2104.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates searching data, comprising:
    at least one processor that executes the following computer executable components stored on a computer readable medium:
    a parser component that parses content in a web page received from a web crawler during a media search operation that is conducted in response to receiving a search request from a first user to produce structure data associated with the web page;

a gallery classifier that determines a number of pieces of media content in the web page based at least in part on the structure data, wherein the pieces of media content include at least one image;

a content analyzer that analyzes the at least one image to determine whether the at least one image includes one or more faces, wherein the gallery classifier analyzes at least the structure data associated with the web page and identifies the web page as a potential gallery page during a search operation, the identification of the web page as a potential gallery page being based at least in part on page characteristics, the page characteristics comprising structure of the web page as represented by the associated structure data and the results of analyzing the at least one image, wherein the gallery classifier determines that the web page contains at least a predetermined number of media items, as indicated by the associated structure data, based at least in part on predetermined gallery page criteria, the media items comprising at least one image and at least one of audio content, video content, image content, multimedia content, or one or more links to at least one of audio content, video content, image content, or multimedia content;

a presentation component that presents the web page to the first user as a search result;

a confirmation component that monitors the first user's interaction with the pieces of media content in the web page and provides information about the first user's interaction to the gallery classifier, wherein the gallery classifier determines whether the first user's interaction is sufficiently substantial based on a predetermined interaction value to warrant classifying the web page as a gallery page, and wherein the gallery classifier processes, in response to determining that the first user's interaction is sufficiently substantial to warrant classifying the web page as a gallery page, the first user's interaction as confirmation that the web page is a gallery page, wherein the web page is classified as a non-gallery page if the first user's interaction is not sufficiently substantial, wherein the gallery classifier tags the web page as a gallery page for results ranking and processing;

a machine learning and reasoning component that employs at least one of a probabilistic or a statistical-based analysis to prognose or infer an action to be automatically performed, wherein said action includes classifying the web page as a gallery page; and an index builder that builds an index of gallery pages, wherein the index of gallery pages includes a classification of the web page as a gallery page; and a ranking component that ranks the indexed gallery pages, wherein the parser component receives a search request from a second user and, in response, the presentation component presents the ranked indexed gallery pages to the second user via a gallery user interface that includes a Galleries section in which groupings of media content are presented as graphical icons, wherein selection of a graphical icon causes presentation of a group of media content files in another section of the gallery user interface.

2. The system of claim 1, wherein the gallery classifier identifies the web page as a gallery page based at least in part on at least one of click behavior of users or hover behavior of users over time in relation to the media items in the web page.

3. The system of claim 2, wherein the gallery classifier identifies the web page as a gallery page if the web page includes more audio content than another web page.

4. The system of claim 2, wherein the gallery classifier identifies the web page as a gallery page if the web page includes more video content than another web page.

5. The system of claim 2, wherein the gallery classifier identifies the web page as a gallery page if the web page includes more image content than another web page.

6. The system of claim 1, wherein the presentation component includes a user interface that facilitates presentation of the web page and associated media content, and allows a user to interact with the media content presented via the user interface.

7. The system of claim 1, wherein the presentation component facilitates ranking the web page above other non-gallery pages that are returned in the search operation.

8. The system of claim 1, further comprising a criteria component that provides the predetermined gallery page criteria to the gallery classifier, the predetermined gallery page criteria is used to determine if the web page is the is a gallery page.

9. The system of claim 8, wherein the predetermined gallery page criteria includes at least one of location of media on a web page, page layout, amount of text per media item on the web page, or media file type.

10. The system of claim 8, wherein the gallery classifier receives user interaction data from the confirmation component that facilitates classifying other web pages as gallery pages.

11. A computer-implemented method of processing search data, comprising:
employing at least one processor executing computer executable instructions stored on a computer readable storage medium to implement the following acts:
receiving a web page from a web crawler during a media search operation that is conducted in response to receiving a search request from a first user;
parsing the web page for structure data, wherein the structure data includes data associated with structure of content in the web page;
determining a number of pieces of media content in the web page based at least in part on the structure data wherein the pieces of media content include at least one image;
analyzing the at least one image to determine whether the image includes one or more faces;
classifying the web page as a potential gallery page based at least in part on the structure data and the results of analyzing the at least one image, wherein the web page is classified as a potential gallery page when the structure data indicates, based at least in part on predetermined criteria, that the web page comprises at least a predetermined number of pieces of media content, the media content comprising at least one of audio content, video content, image content, multimedia content, or a link to at least one of audio content, video content, image content, or multimedia content;
presenting the web page to the first user;
monitoring interaction associated with the pieces of media content in the web page by the first user;
determining whether the first user's interaction is sufficiently substantial based on a predetermined interaction value to warrant classifying the web page as a gallery page;
processing, in response to determining that the first user's interaction is sufficiently substantial to warrant classifying the web page as a gallery page, the first user's interaction as confirmation that the web page is a gallery page, wherein the web page is classified as a non-gallery page if the first user's interaction is not sufficiently substantial;

utilizing a machine learning and reasoning component that employs at least one of a probabilistic or a statistical-based analysis to prognose or infer an action to be automatically performed, wherein said action includes classifying the web page as a gallery page;

tagging the web page as a first gallery page for results ranking and processing;

building an index of gallery pages, wherein the index of gallery pages includes a classification of the web page as a first gallery page;

ranking the indexed gallery pages;

receiving a search request from user; and presenting the ranked indexed gallery pages to the second user via a gallery user interface that includes a Galleries section in which groupings of media content are presented as graphical icons, wherein selection of a graphical icon causes presentation of a group of media content files in another section of the gallery user interface.

12. The method of claim 11, further comprising visually differentiating a plurality of media galleries in the gallery user interface.

13. The method of claim 11, further comprising:
finding a characteristic common to a plurality of gallery pages during the media search operation; and
utilizing the characteristic to classify a next web page as a gallery page or a non-gallery page during a subsequent media search operation.

14. The method of claim 11, wherein the gallery user interface further includes a search input box that enables a user to search the presented group of media content files according to metadata associated with each of the media content files.

15. The method of claim 11, wherein the gallery user interface includes a drop-down menu that includes selectable options for presenting only audio gallery content, only video gallery content, or only image gallery content.

16. A computer executable system, the system comprising:
at least one processor that executes the following computer executable components stored on a computer readable medium:
a parser component that receives a web page from a web crawler during a media search operation that is conducted in response to receiving a search request from a first user and that parses the web page for structure data, wherein the structure data includes data associated with structure of content in the web page;
a gallery classifier that determines a number of pieces of media content in the web page based at least in part on the structure data, wherein the pieces of media content include at least one image;
an analyzer that analyzes the at least one image to determine whether the at least one image includes one or more faces, wherein the gallery classifier classifies the web page as a potential gallery page based at least in part on the structure data and the results of analyzing the at least one image, wherein the web page is classified as a potential gallery page when the structure data indicates, based at least in part on predetermined criteria, that the web page includes at least a predetermined number of pieces of media content, the media content comprising at least one of audio content, video content, image content, multimedia content, or one or more links to at least one of audio content, video content, image content, or multimedia content;
a machine learning and reasoning component that employs at least one of a probabilistic or a statistical-based analysis to prognose or infer an action to be automatically performed, wherein said action includes classifying the web page as a gallery page;
a presentation component that presents the web page to the first user;
a confirmation component that monitors interaction associated with the pieces of media content in the web page by the first user, wherein the gallery classifier determines whether the first user's interaction is sufficiently substantial based on a predetermined interaction value to warrant classifying the web page as a gallery page, and wherein the gallery classifier processes, in response to determining that the first user's interaction is sufficiently substantial to warrant classifying the web page as a gallery page, the first user's interaction as confirmation that the web page is a gallery page, wherein the web page is classified as a non-gallery page if the first user's interaction is not sufficiently substantial, wherein the gallery classifier tags the web page as a gallery page for results ranking and processing;
an index builder that builds an index of gallery pages, wherein the index of gallery pages includes a classification of the web page as a gallery page; and
a ranking component that ranks the indexed gallery pages, wherein the parser component receives a search request from a second user and, in response, the presentation component presents the ranked indexed gallery pages to the second user via a gallery user interface that includes a Galleries section in which groupings of media content are presented as graphical icons, wherein selection of a graphical icon causes presentation of a group of media content files in another section of the gallery user interface.

* * * * *